(12) United States Patent
Praetorius et al.

(10) Patent No.: US 11,578,156 B2
(45) Date of Patent: Feb. 14, 2023

(54) DUAL METALLOCENE POLYETHYLENE WITH IMPROVED PROCESSABILITY FOR LIGHTWEIGHT BLOW MOLDED PRODUCTS

(71) Applicant: Chevron Phillips Chemical Company LP, The Woodlands, TX (US)

(72) Inventors: Jeremy M. Praetorius, Bartlesville, OK (US); Yongwoo Inn, Bartlesville, OK (US); Alfred E. Brown, Jr., Collinsville, OK (US); Brandy Rutledge-Ryal, Bartlesville, OK (US); Carlos A. Cruz, Bartlesville, OK (US); Jay M. Chaffin, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 305 days.

(21) Appl. No.: 17/074,784

(22) Filed: Oct. 20, 2020

(65) Prior Publication Data
US 2022/0119562 A1    Apr. 21, 2022

(51) Int. Cl.
| | | |
|---|---|---|
| C08L 23/08 | (2006.01) | |
| C08F 210/16 | (2006.01) | |
| C08F 4/653 | (2006.01) | |
| C08F 4/6592 | (2006.01) | |
| C08F 210/02 | (2006.01) | |

(52) U.S. Cl.
CPC .......... *C08F 210/02* (2013.01); *C08F 210/16* (2013.01); *C08L 23/0815* (2013.01); *C08F 4/65925* (2013.01); *C08F 4/65927* (2013.01); *C08F 2420/01* (2013.01); *C08F 2420/03* (2013.01)

(58) Field of Classification Search
CPC .......... C08L 23/0815; C08F 4/65904
See application file for complete search history.

(56) References Cited

U.S. PATENT DOCUMENTS

| | | | |
|---|---|---|---|
| 3,242,099 A | 3/1966 | Manyik | |
| 3,248,179 A | 4/1966 | Norwood | |
| 4,501,885 A | 2/1985 | Sherk | |
| 4,588,790 A | 5/1986 | Jenkins, III | |
| 4,794,096 A | 12/1988 | Ewen | |
| 4,808,561 A | 2/1989 | Welborn, Jr. | |
| 5,352,749 A | 10/1994 | Dechellis | |
| 5,436,304 A | 7/1995 | Griffin | |
| 5,565,175 A | 10/1996 | Hottovy | |
| 5,575,979 A | 11/1996 | Hanson | |
| 5,576,259 A | 11/1996 | Hasegawa | |
| 5,807,938 A | 9/1998 | Kaneko | |
| 5,919,983 A | 7/1999 | Rosen | |
| 6,107,230 A | 8/2000 | McDaniel | |
| 6,165,929 A | 12/2000 | McDaniel | |
| 6,239,235 B1 | 5/2001 | Hottovy | |
| 6,262,191 B1 | 7/2001 | Hottovy | |
| 6,294,494 B1 | 9/2001 | McDaniel | |
| 6,300,271 B1 | 10/2001 | McDaniel | |
| 6,316,553 B1 | 11/2001 | McDaniel | |
| 6,355,594 B1 | 3/2002 | McDaniel | |
| 6,376,415 B1 | 4/2002 | McDaniel | |
| 6,388,017 B1 | 5/2002 | McDaniel | |
| 6,391,816 B1 | 5/2002 | McDaniel | |
| 6,395,666 B1 | 5/2002 | McDaniel | |
| 6,524,987 B1 | 2/2003 | Collins | |
| 6,548,441 B1 | 4/2003 | McDaniel | |
| 6,548,442 B1 | 4/2003 | McDaniel | |
| 6,576,583 B1 | 6/2003 | McDaniel | |
| 6,613,712 B1 | 9/2003 | McDaniel | |
| 6,632,894 B1 | 10/2003 | McDaniel | |
| 6,667,274 B1 | 12/2003 | Hawley | |
| 6,750,302 B1 | 6/2004 | McDaniel | |
| 6,833,415 B2 | 12/2004 | Kendrick | |
| 7,026,494 B1 | 4/2006 | Yang | |
| 7,041,617 B2 | 5/2006 | Jensen | |
| 7,199,073 B2 | 4/2007 | Martin | |
| 7,226,886 B2 | 6/2007 | Jayaratne | |
| 7,294,599 B2 | 11/2007 | Jensen | |
| 7,312,283 B2 | 12/2007 | Martin | |
| 7,517,939 B2 | 4/2009 | Yang | |
| 7,531,606 B2 | 5/2009 | Hendrickson | |
| 7,598,327 B2 | 10/2009 | Shaw | |
| 7,601,665 B2 | 10/2009 | McDaniel | |

(Continued)

OTHER PUBLICATIONS

International Search and Written Opinion issued in corresponding application No. PCT/US2021/071830, dated Mar. 9, 2022, 12 pp.
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Film Extrusion Manual—Process, Materials, Properties, TAPPI Press, 1992, 16 pages.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.

(Continued)

*Primary Examiner* — Caixia Lu
(74) *Attorney, Agent, or Firm* — Merchant & Gould P.C.

(57) ABSTRACT

Ethylene-based polymers having a density of 0.952 to 0.968 g/cm$^3$, a ratio of HLMI/MI from 185 to 550, an IB parameter from 1.46 to 1.80, a tan δ at 0.1 sec$^{-1}$ from 1.05 to 1.75 degrees, and a slope of a plot of viscosity versus shear rate at 100 sec$^{-1}$ from 0.18 to 0.28 are described, with low melt flow versions having a HLMI from 10 to 30 g/10 min and a Mw from 250,000 to 450,000 g/mol, and high melt flow versions having a HLMI from 30 to 55 g/10 min and a Mw from 200,000 to 300,000 g/mol. These polymers have the processability of chromium-based resins, but with improved stress crack resistance and topload strength for bottles and other blow molded products.

20 Claims, 2 Drawing Sheets

(56) References Cited

U.S. PATENT DOCUMENTS

| | | | |
|---|---|---|---|
| 7,619,047 B2 * | 11/2009 | Yang | C08F 10/00 526/943 |
| 7,884,163 B2 | 2/2011 | McDaniel | |
| 8,114,946 B2 | 2/2012 | Yang | |
| 8,273,170 B2 | 9/2012 | Kazuaki | |
| 8,309,485 B2 | 11/2012 | Yang | |
| 8,383,754 B2 | 2/2013 | Yang | |
| 8,623,973 B1 | 1/2014 | Mcdaniel | |
| 8,822,608 B1 | 9/2014 | Bhandarkar | |
| 9,023,959 B2 | 5/2015 | Mcdaniel | |
| 9,169,337 B2 | 10/2015 | Rohatgi | |
| 9,273,170 B2 * | 3/2016 | Hlavinka | C08L 23/0815 |
| 9,475,898 B2 | 10/2016 | Rohatgi | |
| 9,493,589 B1 * | 11/2016 | Greco | B29C 49/0005 |
| 9,550,849 B2 | 1/2017 | Hlavinka | |
| 9,650,459 B2 | 5/2017 | Greco | |
| 9,758,600 B1 | 9/2017 | Praetorius | |
| 10,336,892 B2 | 7/2019 | Vantomme | |
| 10,590,212 B2 | 3/2020 | Doufas | |
| 2015/0126692 A1 * | 5/2015 | Sukhadia | C08F 210/08 526/64 |
| 2015/0259455 A1 | 9/2015 | Hlavinka | |
| 2017/0066857 A1 | 3/2017 | Greco | |
| 2019/0359738 A1 | 11/2019 | Suk-Em | |
| 2021/0024728 A1 | 1/2021 | Cruz | |

OTHER PUBLICATIONS

IUPAC Compendium of Chemical Terminology, 2nd Ed. 1997, pp. 1-1670.

Janzen, et al., "Diagnosing Long-Chain Branching in Polyethylene," Journal of Mol. Struct., 485/486, 1999, pp. 569-584.

Modern Plastics Encyclopedia, Mid-Nov. 1995 Issue, vol. 72, No. 12, 3 pages.

* cited by examiner

DUAL METALLOCENE POLYETHYLENE WITH IMPROVED PROCESSABILITY FOR LIGHTWEIGHT BLOW MOLDED PRODUCTS

BACKGROUND OF THE INVENTION

Polyolefins such as high density polyethylene (HDPE) homopolymer and copolymer and linear low density polyethylene (LLDPE) copolymer can be produced using various combinations of catalyst systems and polymerization processes.

Chromium-based catalyst systems can, for example, produce ethylene-based polymers having good extrusion processability and polymer melt strength, typically due to their broad molecular weight distribution (MWD).

In some end-use applications, such as blow molding, it can be beneficial to have the processability, cycle time, and melt strength similar to that of an ethylene polymer produced using a chromium-based catalyst system, as well as improvements in one or more of stiffness/modulus, strength, and environmental stress crack resistance (ESCR)—and preferably at equivalent or higher polymer densities. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to lower melt flow ethylene polymers (e.g., ethylene/α-olefin copolymers) characterized by a density in a range from about 0.952 to about 0.968 g/cm$^3$, a high load melt index (HLMI) in a range from about 10 to about 30 g/10 min, a ratio of HLMI/MI in a range from about 185 to about 550, a weight-average molecular weight (Mw) in a range from about 250,000 to about 450,000 g/mol, an IB parameter in a range from about 1.46 to about 1.80, an IVc in a range from about 2.2 to about 3.2 dL/g, a tan δ (tan d or tangent delta) at 0.1 sec$^{-1}$ in a range from about 1.05 to about 1.75 degrees, and a slope of a plot of viscosity (Pa-sec) versus shear rate (sec$^{-1}$) of the ethylene polymer at 100 sec$^{-1}$ in a range from about 0.18 to about 0.28. Also disclosed and encompassed herein are higher melt flow ethylene polymers having a density in a range from about 0.952 to about 0.968 g/cm$^3$, a high load melt index (HLMI) in a range from about 30 to about 55 g/10 min, a ratio of HLMI/MI in a range from about 185 to about 550, a weight-average molecular weight (Mw) in a range from about 200,000 to about 300,000 g/mol, an IB parameter in a range from about 1.46 to about 1.80, a tan δ (tan d or tangent delta) at 0.1 sec$^{-1}$ in a range from about 1.05 to about 1.75 degrees, and a slope of a plot of viscosity (Pa-sec) versus shear rate (sec$^{-1}$) of the ethylene polymer at 100 sec$^{-1}$ in a range from about 0.18 to about 0.28. These ethylene polymers can be used to produce various articles of manufacture, such as blow molded bottles.

Another aspect of this invention is directed to a dual catalyst system, and in this aspect, the dual catalyst system can comprise catalyst component I comprising an unbridged metallocene compound, catalyst component II comprising a bridged metallocene compound, an activator, and optionally, a co-catalyst. In yet another aspect, an olefin polymerization process is provided, and in this aspect, the process can comprise contacting any catalyst composition disclosed herein with an olefin monomer and an optional olefin comonomer in a polymerization reactor system under polymerization conditions to produce an olefin polymer. For instance, the olefin monomer can be ethylene, and the olefin comonomer can be 1-butene, 1-hexene, 1-octene, or a mixture thereof.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
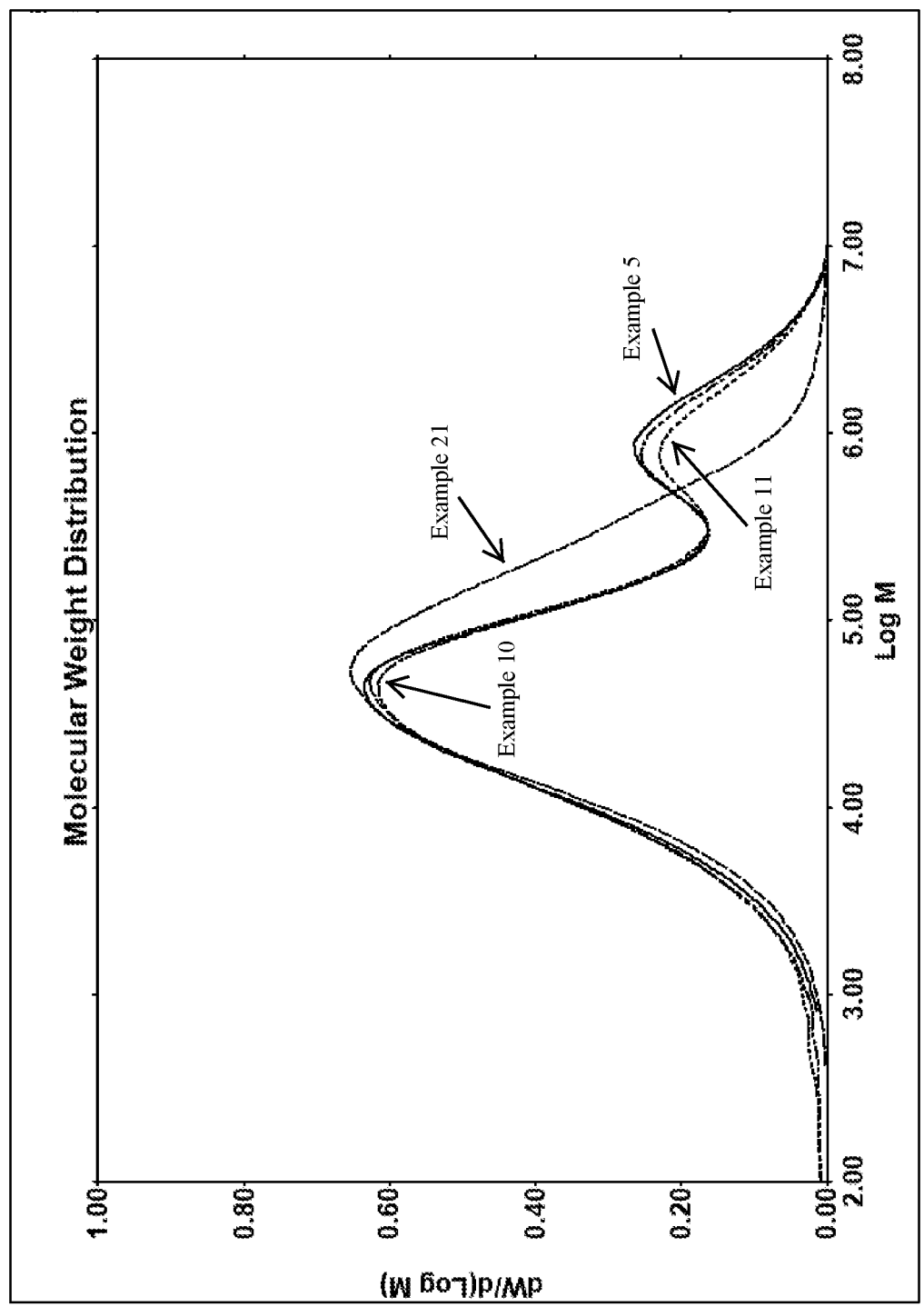
FIG. 1 presents a plot of the molecular weight distributions of the polymers of Examples 5, 10-11, and 21.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods also can "consist essentially of" or "consist of" the various components or steps, unless stated otherwise.

For example, a catalyst composition consistent with aspects of the present invention can comprise; alternatively, can consist essentially of; or alternatively, can consist of; catalyst component I, catalyst component II, an activator, and a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News,* 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers, and is inclusive of lower molecular weight polymers.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands can include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, catalyst component I, catalyst component II, or the activator (e.g., activator-support), after combining these components. Therefore, the terms "catalyst composition," "catalyst mixture." "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise combined in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 12 to about 30, the intent is to recite that the ratio of Mw/Mn can be any ratio in the range and, for example, can be equal to about 12, about 14, about 16, about 18, about 20, about 22, about 24, about 26, about 28, or about 30. Additionally, the ratio of Mw/Mn can be within any range from about 12 to about 30 (for example, from about 12 to about 28), and this also includes any combination of ranges between about 12 and about 30 (for example, the Mw/Mn ratio can be in a range from about 12 to about 26, or from about 17 to about 28). Further, in all instances, where "about" a particular value is disclosed, then that value itself is disclosed. Thus, the disclosure that the ratio of Mw/Mn can be from about 12 to about 30 also discloses a ratio of Mw/Mn from 12 to 30 (for example, from 12 to 28), and this also includes any combination of ranges between 12 and 30 (for example, the Mw/Mn ratio can be in a range from 12 to 26, or from 17 to 28). Likewise, all other ranges disclosed herein should be interpreted in a manner similar to these examples.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

The present invention is directed generally to dual metallocene catalyst systems, methods for using the catalyst systems to polymerize olefins, the polymer resins produced using such catalyst systems, and blow molded products and other articles produced using these polymer resins. In particular, the present invention relates to metallocene-based ethylene polymers having processability, cycle time, and melt strength attributes similar to that of chromium-based ethylene polymers, but with improved ESCR, stiffness/modulus, and bottle topload strength—and beneficially, at higher polymer densities. Bottle topload strengths, unexpectedly, were improved by 25-40% relative to comparable chromium-based polymers.

Moreover, due to these improved performance attributes, blow molded bottles and other molded products can be produced with equivalent (or superior) properties at lower part weights (downgauging or thin-walling) or with higher levels of post-consumer recycled polymer incorporated therein. For instance, the disclosed ethylene polymers can produce articles that are 10-30% lighter, but with topload performance that is equivalent or superior to that of thicker/heavier articles produced from chromium-based polymers.

While not wishing to be bound by the following theory, it is believed that the combined density, melt flow (e.g., HLMI, HLM/MI), molecular weight (e.g., Mw, IB parameter, IVc), and rheological (e.g., tan δ at 0.1 sec$^{-1}$, rheological slope at 100 sec$^{-1}$) attributes result in the desired processability/extruder output, cycle time, melt strength, weight swell, ESCR, stiffness/modulus, and strength properties described herein. For instance, the ratio of HLMI/MI and the rheological properties described herein at 100 sec$^{-1}$ are indicative of a high shear thinning polymer with good extrusion and blow molding processability. The (low frequency) tan δ at 0.1 sec$^{-1}$ of greater than 1, as opposed to less than 1, is indicative of a polymer with relatively low elasticity at low shear, which can be beneficial for certain small part blow molding applications.

It was unexpectedly found that the combination of polymer properties of the ethylene polymers disclosed herein results in improvements over the conventional chromium-based and metallocene-based blow molding resins, in particular, for smaller blow molded parts, such as bottles.

Another benefit of the disclosed ethylene-based polymers is a desirable combination of extruder output and weight swell, resulting in the ability to use higher melt flow (e.g., HLMI) and lower molecular weight (e.g., Mw) polymers on extrusion and molding equipment originally configured for chromium-based polymer processing. Consequently, extruder output can be increased in combination with lower extrusion pressures on existing equipment, without equipment modification.

As described herein, particular combinations of unbridged and bridged metallocene compounds, at specific relative amounts of the respective metallocene compounds, and with appropriate levels of hydrogen addition, can result in the unexpected and beneficial properties of the disclosed ethylene polymers.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_4$-$C_{10}$ α-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from about 0.01 to about 20 wt. %, from about 0.01 to about 1 wt. %, from about 0.5 to about 15 wt. %, from about 0.5 to about 8 wt. %, or from about 1 to about 15 wt. %.

In one aspect, the ethylene polymer of this invention can comprise an ethylene/α-olefin copolymer, while in another aspect, the ethylene polymer can comprise an ethylene homopolymer, and in yet another aspect, the ethylene polymer of this invention can comprise an ethylene/α-olefin copolymer and an ethylene homopolymer. For example, the ethylene polymer can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer.

Two types of ethylene polymers are disclosed herein. The first ethylene polymer is a lower melt flow (or higher molecular weight) ethylene polymer, typically with a high load melt index (HLMI) in a range from about 10 to about 30 g/10 min, and a weight-average molecular weight (Mw) in a range from about 250,000 to about 450,000 g/mol, whereas the second ethylene polymer is a higher melt flow (or lower molecular weight) ethylene polymer, typically with a high load melt index (HLMI) in a range from about 30 to about 55 g/10 min, and a weight-average molecular weight (Mw) in a range from about 200,000 to about 300,000 g/mol.

An illustrative and non-limiting example of the first ethylene polymer (e.g., comprising an ethylene copolymer) consistent with the present invention can have a density in a range from about 0.952 to about 0.968 g/cm$^3$; a HLMI in a range from about 10 to about 30 g/10 min, and a ratio of HLMI/MI in a range from about 185 to about 550; a Mw in a range from about 250,000 to about 450,000 g/mol; an IB parameter in a range from about 1.46 to about 1.80; an IVc in a range from about 2.2 to about 3.2 dL/g; a tan δ (tan d or tangent delta) at 0.1 sec$^{-1}$ in a range from about 1.05 to about 1.75 degrees; and a slope of a plot of viscosity (Pa-sec) versus shear rate (sec$^{-1}$) of the ethylene polymer at 100 sec$^{-1}$ in a range from about 0.18 to about 0.28. The HLMI of the first ethylene polymer, in some aspects, can be in a range from about 15 to about 30, from about 20 to about 30, from about 15 to about 28, or from about 20 to about 28 g/10 min. Likewise, in some aspects, the Mw of the first ethylene polymer can range from about 250,000 to about 400,000, from about 250,000 to about 370,000, from about 250,000 to about 340,000, from about 270,000 to about 370,000, or from about 270,000 to about 320,000 g/mol.

An illustrative and non-limiting example of the second ethylene polymer consistent with the present invention can have a density in a range from about 0.952 to about 0.968 g/cm$^3$; a HLMI in a range from about 30 to about 55 g/10 min, and a ratio of HLMI/MI in a range from about 185 to about 550; a Mw in a range from about 200,000 to about 300,000 g/mol; an IB parameter in a range from about 1.46 to about 1.80; a tan δ (tan d or tangent delta) at 0.1 sec$^{-1}$ in a range from about 1.05 to about 1.75 degrees; and a slope of a plot of viscosity (Pa-sec) versus shear rate (sec$^{-1}$) of the ethylene polymer at 100 sec$^{-1}$ in a range from about 0.18 to about 0.28. The HLMI of the second ethylene polymer, in some aspects, can be in a range from about 30 to about 50, from about 30 to about 48, from about 32 to about 50, or from about 32 to about 48 g/10 min. Likewise, in some aspects, the Mw of the second ethylene polymer can range from about 200,000 to about 280,000, from about 210,000 to about 300,000, from about 210,000 to about 280,000, from about 230,000 to about 300,000, or from about 230,000 to about 280,000 g/mol.

These illustrative and non-limiting examples of the first ethylene polymer and the second ethylene polymer consistent with the present invention also can have any of the polymer properties listed below and in any combination, unless indicated otherwise.

The densities of ethylene-based polymers disclosed herein often are greater than or equal to about 0.952 g/cm$^3$, for example, greater than or equal to about 0.955 g/cm$^3$, or greater than or equal to about 0.957 g/cm$^3$. Yet, in particular aspects, the density can be in a range from about 0.952 to about 0.966 g/cm$^3$, from about 0.955 to about 0.968 g/cm$^3$, from about 0.955 to about 0.966 g/cm$^3$, from about 0.957 to about 0.968 g/cm$^3$, or from about 0.957 to about 0.966 g/cm$^3$.

The ethylene polymers described herein often can have a melt index (MI) of less than or equal to about 1 g/10 min, less than or equal to about 0.8 g/10 min, or less than or equal to about 0.6 g/10 min. In further aspects, the ethylene polymers described herein can have a melt index (MI) in a range from about 0.03 to about 0.6 g/10 min, from about 0.03 to about 0.3 g/10 min, from about 0.05 to about 0.3 g/10 min, or from about 0.05 to about 0.2 g/10 min.

While not being limited thereto, these ethylene polymers can have a ratio of HLMI/MI in a range from about 185 to about 550; alternatively, from about 200 to about 550; alternatively, from about 300 to about 550; alternatively, from about 250 to about 550; alternatively, from about 250 to about 500; alternatively, from about 275 to about 550; or alternatively, from about 275 to about 475.

In an aspect, the ethylene polymers can have a ratio of Mw/Mn, or the polydispersity index, in a range from about 12 to about 30, such as from about 12 to about 28, from about 12 to about 26, from about 14 to about 30, from about 14 to about 28, or from about 17 to about 28. Additionally or alternatively, the ethylene polymers can have a ratio of Mz/Mw in a range from about 4.5 to about 8, such as from about 5 to about 8, from about 5 to about 7.5, from about 5.3 to about 8, from about 5.3 to about 7.5, from about 5.3 to about 7.2, or from about 5.5 to about 7.5.

In an aspect, the ethylene polymers described herein can have a peak molecular weight (Mp) in a range from about 25,000 to about 55,000, from about 25,000 to about 50,000, from about 25,000 to about 45,000, from about 25,000 to about 40,000, from about 30,000 to about 55,000, or from about 30,000 to about 50,000 g/mol. Additionally or alternatively, the ethylene polymers can have a number-average molecular weight (Mn) in a range from about 8,000 to about 30,000, from about 8,000 to about 25,000, from about 8,000 to about 18,000, from about 10,000 to about 30,000, or from about 10,000 to about 25,000 g/mol. Additionally or alternatively, the ethylene polymers can have a z-average molecular weight (Mz) in a range from about 1,300,000 to about 2,600,000, from about 1,300,000 to about 2,100,000, from about 1,300,000 to about 1,900,000, from about 1,500,000 to about 2,500,000, or from about 1,500,000 to about 2,300,000 g/mol. Additionally or alternatively, the ethylene polymers can have a viscosity-average molecular weight (Mv) in a range from about 140,000 to about 280,000, from about 150,000 to about 250,000, from about 150,000 to about 230,000, from about 150,000 to about 200,000, from about 150,000 to about 185,000, or from about 180,000 to about 220,000 g/mol.

While not being limited thereto, the ethylene polymers described herein can have an IVc (intrinsic viscosity determined by GPC) that typically falls within a range from about 2.2 to about 3.2 dL/g. In one aspect, the IVc can be in a range from about 2.2 to about 3.1 or from about 2.2 to about 3, while in another aspect, the IVc can be in a range from about 2.3 to about 3.2, from about 2.3 to about 3.1, or from about 2.3 to about 3, and in yet another aspect, the IVc can be in a range from about 2.5 to about 3.1 dL/g. IVc is correlated with Mv, and for these ethylene polymers, generally with Mw as well; typically, higher IVc values coincide with higher Mv and Mw values.

In accordance with certain aspects of this invention, the IB parameter from a molecular weight distribution curve (plot of dW/d(Log M) vs. Log M; normalized to an area equal to 1) can be an important characteristic of the ethylene polymers described herein. The IB parameter is often referred to as the integral breadth, and is defined as $1/[dW/d(\text{Log M})]_{MAX}$, and is useful to describe the shape of the largest peak in a bimodal MWD: the largest peak is smaller/broader as the IB parameter increases. Generally, the IB parameter of the ethylene polymers consistent with this invention can be in a range from about 1.46 to about 1.80. In one aspect, the ethylene polymer can be characterized by an IB parameter in a range from about 1.46 to about 1.75 or from about 1.46 to about 1.65, and in another aspect, the IB parameter can range from 1.48 to about 1.80 or from about 1.48 to about 1.70, and in yet another aspect, the IB parameter can range from about 1.50 to about 1.80, from about 1.50 to about 1.75, or from about 1.50 to about 1.70.

Ethylene polymers consistent with certain aspects of the invention often can have a bimodal molecular weight distribution (as determined using gel permeation chromatography (GPC) or other related analytical technique). Often, in a bimodal molecular weight distribution, there is a valley between the peaks, and the peaks can be separated or deconvoluted. Typically, a bimodal molecular weight distribution can be characterized as having an identifiable high molecular weight component (or distribution) and an identifiable low molecular weight component (or distribution). Illustrative unimodal MWD curves and bimodal MWD curves are shown in U.S. Pat. No. 8,383,754, incorporated herein by reference in its entirety.

These ethylene polymers can have a tan δ (tan d or tangent delta) at 0.1 sec$^{-1}$ in a range from about 1.05 to about 1.75 degrees, and a (rheological) slope of a plot of viscosity (Pa-sec) versus shear rate (sec$^{-1}$) of the ethylene polymer at 100 sec$^{-1}$ in a range from about 0.18 to about 0.28. For instance, the ethylene polymer can have a tan δ at 0.1 sec$^{-1}$ in a range from about 1.05 to about 1.65; alternatively, from about 1.05 to about 1.55; alternatively, from about 1.05 to about 1.45; alternatively, from about 1.10 to about 1.70; alternatively, from about 1.10 to about 1.60; or alternatively, from about 1.10 to about 1.50 degrees. Likewise, the ethylene polymer can a rheological slope at 100 sec$^{-1}$ in a range from about 0.18 to about 0.27; alternatively, from about 0.18 to about 0.26; alternatively, from about 0.19 to about 0.27; alternatively, from about 0.19 to about 0.25; alternatively, from about 0.20 to about 0.28; or alternatively, from about 0.20 to about 0.26. These rheological parameters are determined from viscosity data measured at 190° C. and using the Carreau-Yasuda (CY) empirical model described herein.

Additionally or alternatively, these ethylene polymers can have a tan δ (tan d or tangent delta) at 100 sec$^{-1}$ and 190° C. in a range from about 0.3 to about 0.5, from about 0.3 to about 0.45, from about 0.3 to about 0.42, from about 0.3 to about 0.4, from about 0.32 to about 0.42, or from about 0.32 to about 0.4 degrees. Additionally or alternatively, these ethylene polymers can have a CY-a parameter of from about 0.3 to about 0.6, from about 0.3 to about 0.5, from about 0.32 to about 0.55, from about 0.32 to about 0.5, from about 0.34 to about 0.5, or from about 0.34 to about 0.48, and the like. Additionally or alternatively, these ethylene polymers can have a relaxation time (Tau(eta) or τ(η)) in a range from about 3 to about 30 sec, such as from about 3 to about 20, from about 5 to about 30, or from about 5 to about 20 sec. Additionally or alternatively, these ethylene polymers can have a viscosity at 100 sec$^{-1}$ (eta @ 100 or η @ 100) at 190° C. in a range from about 1000 to about 2200, from about 1000 to about 1500, from about 1000 to about 1400, from about 1100 to about 2000, or from about 1400 to about 1800 Pa-sec. Additionally or alternatively, these ethylene polymers can be characterized by a viscosity at HLMI (eta @ HLMI or η @ HLMI) at 190° C. in a range from about 100 to about 1400 Pa-sec, and more often, in a range from about 100 to about 1200, from about 100 to about 500, from about 300 to about 1200, from about 400 to about 1200, or from about 400 to about 1000 Pa-sec. These rheological parameters are determined from viscosity data measured at 190° C. and using the Carreau-Yasuda (CY) empirical model described herein.

Generally, ethylene polymers in aspects of the present invention are essentially linear or have very low levels of long chain branching, with typically less than about 0.01 long chain branches (LCBs) per 1000 total carbon atoms—using the Janzen-Colby model—and often similar in LCB content to polymers shown, for example, in U.S. Pat. Nos. 7,517,939, 8,114,946, and 8,383,754, which are incorporated herein by reference in their entirety. In some aspects, the number of LCBs per 1000 total carbon atoms can be less than about 0.008, less than about 0.007, less than about 0.005, or less than about 0.003 LCBs per 1000 total carbon atoms.

Ethylene copolymers, for example, produced using the polymerization processes and catalyst systems described herein can, in some aspects, have a reverse comonomer distribution, generally, the higher molecular weight components of the polymer have higher comonomer incorporation than the lower molecular weight components. Typically, there is increasing comonomer incorporation with increasing molecular weight. In one aspect, the number of short chain branches (SCBs) per 1000 total carbon atoms of the polymer can be greater at Mw than at Mn. In another aspect, the number of SCBs per 1000 total carbon atoms of the polymer can be greater at Mz than at Mw. In yet another aspect, the number of SCBs per 1000 total carbon atoms of the polymer can be greater at Mz than at Mn.

Consistent with aspects of this disclosure, the ethylene polymers can have an environmental stress crack resistance (ESCR) of at least 250 hours. Moreover, in some aspects, the ethylene polymers described herein can have an ESCR of at least 500 hours, at least 1,000 hours, at least 1,500 hours, at least 2,000 hours, or at least 2,500 hours, and often can range as high as 3,000 to 5,000 hours. The ESCR test is typically stopped after a certain number of hours is reached, and given the long duration of the test, the upper limit of ESCR (in hours) is generally not determined. ESCR testing and test results disclosed herein are in accordance with ASTM D1693, condition B, 10% igepal, which is a much more stringent test than ESCR testing conducted using a 100% igepal solution.

Aspects of this invention also are directed to the performance of these ethylene polymers (e.g., ethylene/1-hexene copolymers) on representative blow molding equipment, as described hereinbelow. The ethylene polymers disclosed herein can have processability and die swell properties that are comparable to chromium-based resins. Beneficially, however, the first ethylene polymer and the second ethylene polymer can have improved strength properties, such as bottle topload strength, over the chromium-based resins, with bottle topload strengths for part weights of 105 g that often can range from about 180 to about 270 lb, from about 200 to about 270 lb, from about 200 to about 260 lb, or from about 210 to about 260 lb. For downgauged or thin-walled parts, the bottle top strength are still surprisingly high, with topload strengths—for part weights of 95 g—ranging from about 160 to about 230 lb, from about 160 to about 220 lb, from about 170 to about 230 lb, or from about 170 to about 220 lb.

In an aspect, the ethylene polymers described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

Moreover, the ethylene polymers can be produced with dual metallocene catalyst systems containing zirconium and/or hafnium, discussed further below. Ziegler-Natta and chromium based catalysts systems are not required. Therefore, the ethylene polymer can contain no measurable amount of chromium or titanium (catalyst residue), i.e., less than 0.1 ppm by weight. In some aspects, the ethylene polymer can contain, independently, less than 0.08 ppm, less than 0.05 ppm, or less than 0.03 ppm, of chromium and titanium.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product (e.g., panels for walls of an outdoor shed), outdoor play equipment (e.g., kayaks, bases for basketball goals), a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of olefin polymers (or ethylene polymers) described herein, and the article of manufacture can be or can comprise a blow molded product, such as a blow molded bottle.

Also contemplated herein is a method for forming or preparing an article of manufacture comprising any polymer disclosed herein. For instance, a method can comprise (i) contacting a catalyst composition with an olefin monomer (e.g., ethylene) and an optional olefin comonomer under polymerization conditions in a polymerization reactor system to produce an olefin polymer (e.g., an ethylene polymer), wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the olefin polymer (or ethylene polymer). The forming step can comprise blending, melt processing, extruding, molding (e.g., blow molding), or thermoforming, and the like, including combinations thereof. Any suitable additive can be combined with the polymer in the melt processing step (extrusion step), such as antioxidants, acid scavengers, antiblock additives, slip additives, colorants, fillers, processing aids, UV inhibitors, and the like, as well as combinations thereof.

Catalyst Systems and Polymerization Processes

In accordance with aspects of the present invention, the olefin polymer (e.g., the ethylene polymer) can be produced using a dual catalyst system. In these aspects, catalyst component I can comprise any suitable unbridged metallocene compound disclosed herein, and catalyst component II can comprise any suitable bridged metallocene compound disclosed herein. The catalyst system also can comprise any suitable activator or any activator disclosed herein, and optionally, any suitable co-catalyst or any co-catalyst disclosed herein.

Referring first to catalyst component I, which can comprise an unbridged zirconium or hafnium based metallocene compound containing two cyclopentadienyl groups, two indenyl groups, or a cyclopentadienyl and an indenyl group. In one aspect, catalyst component I can comprise an unbridged zirconium or hafnium based metallocene compound containing two cyclopentadienyl groups. In another aspect, catalyst component I can comprise an unbridged zirconium or hafnium based metallocene compound containing two indenyl groups. In yet another aspect, catalyst component I can comprise an unbridged zirconium or hafnium based metallocene compound containing a cyclopentadienyl group and an indenyl group.

Catalyst component I can comprise, in particular aspects of this invention, an unbridged metallocene compound having formula (I):

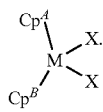

(I)

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein. Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Zr or Hf. Thus, M can be Zr in one aspect, and M can be Hf in another aspect. Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand. Suitable hydrocarbyl groups, hydrocarboxy groups, hydrocarbylaminyl groups, hydrocarbylsilyl groups, and hydrocarbylaminylsilyl groups are disclosed, for example, in U.S. Pat. No. 9,758,600, incorporated herein by reference in its entirety.

Generally, the hydrocarbyl group which can be an X in formula (I) can be a $C_1$ to $C_{36}$ hydrocarbyl group, including a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

In particular aspects of this invention, each X independently can be a halide or a $C_1$ to $C_{18}$ hydrocarbyl group. For instance, each X can be Cl.

In formula (I), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, or two substituents, or three substituents, or four substituents, and so forth.

Suitable hydrocarbyl groups, halogenated hydrocarbyl groups, hydrocarboxy groups, and hydrocarbylsilyl groups that can be substituents are disclosed, for example, in U.S. Pat. No. 9,758,600, incorporated herein by reference in its entirety. For instance, the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

Illustrative and non-limiting examples of unbridged metallocene compounds having formula (I) and/or suitable for use as catalyst component I can include the following compounds (Ph=phenyl):
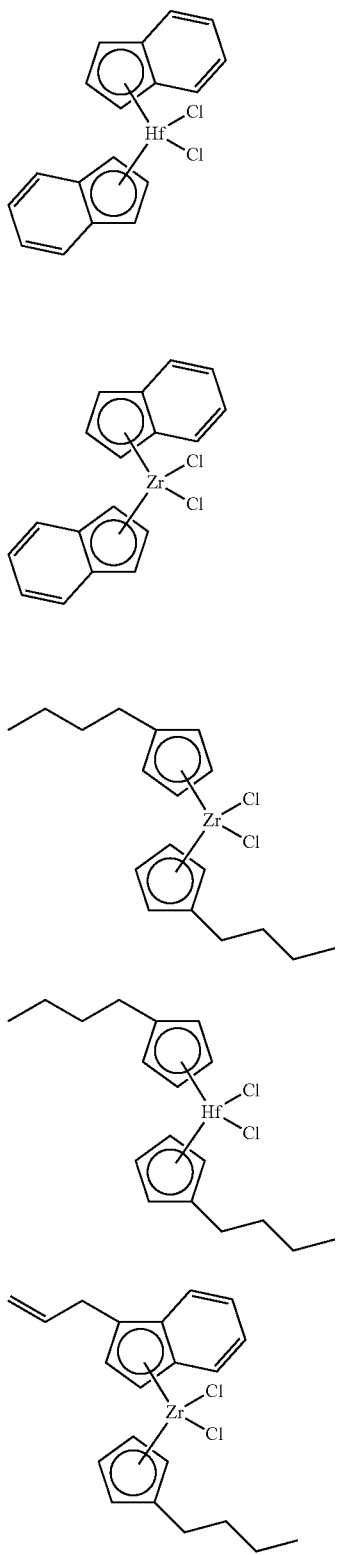
(1)
(2)
(3)
(4)
(5)
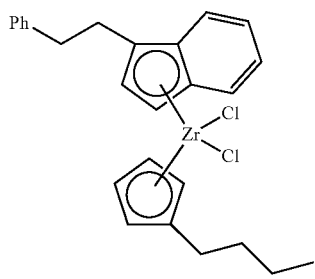
(6)
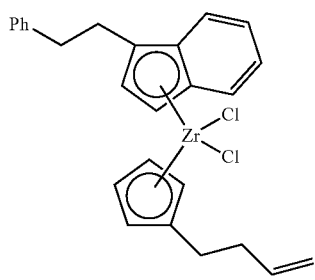
(7)
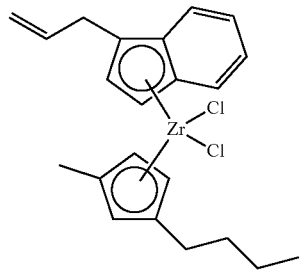
(8)
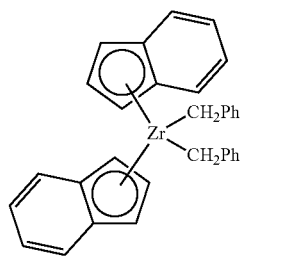
(9)
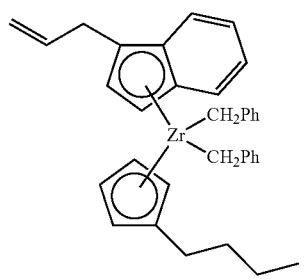
(10)
-continued

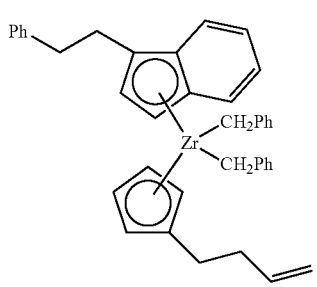

(11)

and the like, as well as combinations thereof.

Catalyst component I is not limited solely to unbridged metallocene compounds such as described above. Other suitable unbridged metallocene compounds are disclosed in U.S. Pat. Nos. 7,199,073, 7,226,886, 7,312,283, and 7,619,047, which are incorporated herein by reference in their entirety.

Referring now to catalyst component II, which can be a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group. Further, catalyst component II can comprise a bridged metallocene compound having an aryl group substituent on the bridging group.

Catalyst component II can comprise, in particular aspects of this invention, a bridged metallocene compound having formula (II):

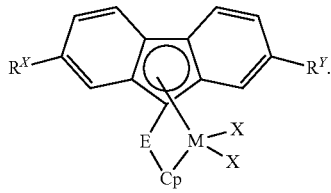

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein. The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, or two substituents, or three substituents, or four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be a bridging group having the formula $>E^A R^A R^B$, wherein $E^A$ can be C, Si, or Ge, and $R^A$ and $R^B$ independently can be H or a $C_1$ to $C_{18}$ hydrocarbyl group. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

Illustrative and non-limiting examples of bridged metallocene compounds having formula (II) and/or suitable for use as catalyst component II can include the following compounds (Me=methyl, Ph=phenyl; t-Bu=tert-butyl):

(14)
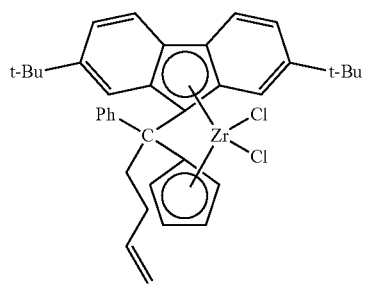
(15)
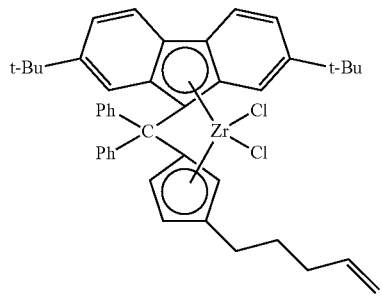
(16)
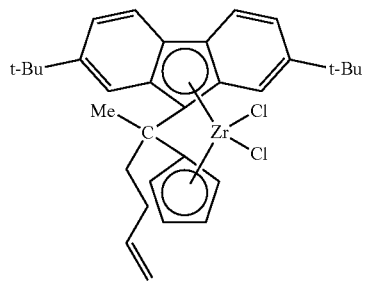
(17)
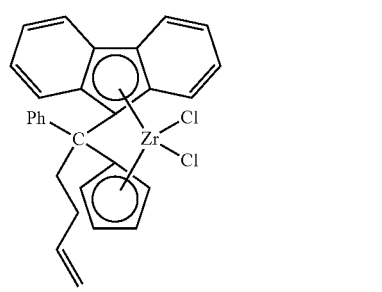
(18)
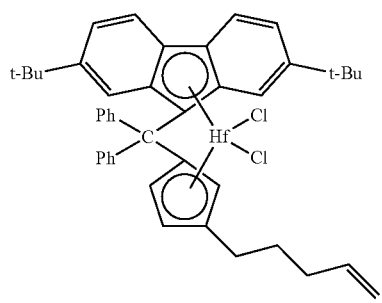
(19)
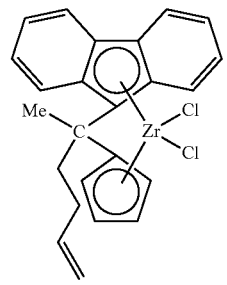
(20)
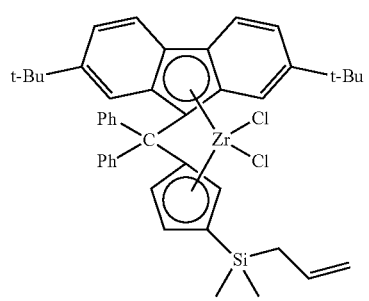
(21)
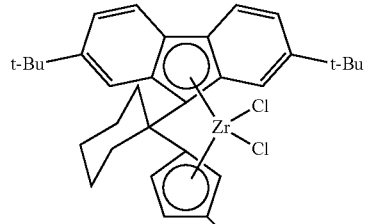
(22)
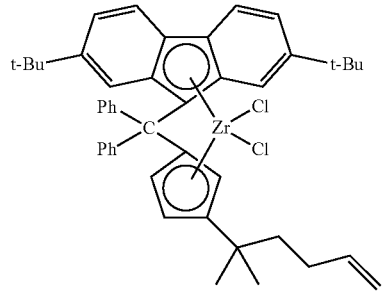
(23)
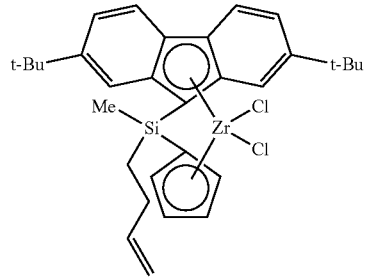

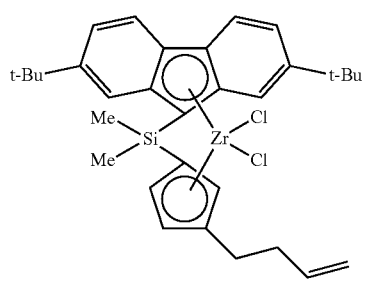
(24)

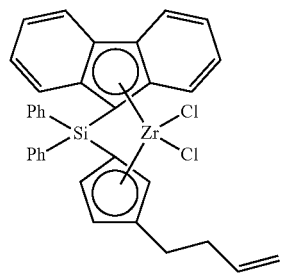
(25)

and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1. In another aspect, catalyst component I is the major component of the catalyst composition, and in such aspects, the weight ratio of catalyst component I to catalyst component II in the catalyst composition can be in a range from about 10:1 to about 1:1, from about 5:1 to about 1.1:1, from about 2:1 to about 1.1:1, or from about 1.8:1 to about 1.1:1.

Additionally, the dual catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides and sulfated solid oxides) are well known to those of skill in the art.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, zinc, and the like. Optionally, the catalyst systems provided herein can comprise a co-catalyst, or a combination of co-catalysts. For instance, alkyl boron, alkyl aluminum, and alkyl zinc compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Exemplary zinc compounds (e.g., organozinc compounds) that can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof. Accordingly, in an aspect of this invention, the dual catalyst composition can comprise catalyst component I, catalyst component II, an activator-support, and an organoaluminum compound (and/or an organozinc compound).

In another aspect of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these aspects, the catalyst composition has catalyst activity, discussed herein, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

Catalyst compositions of the present invention generally have a catalyst activity greater than about 250 grams of ethylene polymer (homopolymer and/or copolymer, as the context requires) per gram of activator-support per hour (abbreviated g/g/hr). In another aspect, the catalyst activity can be greater than about 350, greater than about 450, or greater than about 550 g/g/hr. Yet, in another aspect, the catalyst activity can be greater than about 700 g/g/hr, greater than about 1000 g/g/hr, or greater than about 2000 g/g/hr, and often as high as 5000-10,000 g/g/hr. Illustrative and non-limiting ranges for the catalyst activity include from about 500 to about 5000, from about 750 to about 4000, or from about 1000 to about 3500 g/g/hr, and the like. These activities are measured under slurry polymerization conditions, with a triisobutylaluminum co-catalyst, using isobutane as the diluent, at a polymerization temperature of about 95° C. and a reactor pressure of about 590 psig. Moreover, in some aspects, the activator-support can comprise sulfated alumina, fluorided silica-alumina, or fluorided silica-coated alumina, although not limited thereto.

This invention further encompasses methods of making these catalyst compositions, such as, for example, contacting the respective catalyst components in any order or sequence. In one aspect, for example, the catalyst composition can be produced by a process comprising contacting, in any order, catalyst component I, catalyst component II, and the activator, while in another aspect, the catalyst composition can be produced by a process comprising contacting, in any order, catalyst component I, catalyst component II, the activator, and the co-catalyst.

Olefin polymers (e.g., ethylene polymers) can be produced from the disclosed catalyst systems using any suitable olefin polymerization process using various types of polymerization reactors, polymerization reactor systems, and polymerization reaction conditions. One such olefin polymerization process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise, as disclosed herein, catalyst component I, catalyst component II, an activator, and an optional co-catalyst. This invention also encompasses any olefin polymers (e.g., ethylene polymers) produced by any of the polymerization processes disclosed herein.

As used herein, a "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can be within a range from about 70° C. to about 105° C., or from about 75° C. to about 100° C.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with catalyst compositions and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per minute, and conditioned for 40 hours at room temperature in accordance with ASTM D1505 and ASTM D4703. ESCR was determined in accordance with ASTM D1693, condition B, with 10% igepal. Bottle topload strength was determined in accordance with ASTM D2659, but with 1-gallon bottles (95 g or 105 g empty weight), filled full of water, and with caps on. The bottles were aged for 24 hours at room temperature prior to testing for topload strength, and the bottles were tested at a test speed of 1 inch/min and at a deflection of 0.40 inch. Five bottles were tested for each sample, and the average was recorded.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 µL was used. The integral calibration method was used to deduce molecular weights and molecular weight distributions using a Chevron Phillips Chemical Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, Mv is the viscosity-average molecular weight, and Mp is the peak molecular weight (location, in molecular weight, of the highest point of the molecular weight distribution curve). The IB parameter was determined from the molecular weight distribution curve (plot of dW/d(Log M) vs. Log M; normalized to an area equal to 1), and is defined as $1/[dW/d(\text{Log M})]_{MAX}$. IVc is the intrinsic viscosity [η], which is calculated based on Equation 1:

$$[\eta] = K M_v^a \quad \text{Equation 1}$$

where Mv is the viscosity-average molecular weight, K and a are Mark-Houwink constants for the polymer of interest. For polyethylene, K and a are 3.95E-04 (dL-g) and 0.726 (unitless), respectively. Mv is calculated based on Equation 2:

$$M_V = \left[\frac{\sum w_i M_i^a}{\sum w_i}\right]^{1/a} \quad \text{Equation 2}$$

where $w_i$ and $M_i$ are weight fraction and molecular weight of slice i, respectively.

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta*(\omega)| = \frac{\eta_0}{[1+(\tau_\eta\omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety. The tan δ at 0.1 sec$^{-1}$, tan δ at 100 sec$^{-1}$, rheological slope at 100 sec$^{-1}$, viscosity at 100 sec$^{-1}$, and viscosity at HLMI (viscosity at the HLMI stress for the polymer at its HLMI) properties were determined using the Carreau-Yasuda (CY) empirical model.

Short chain branch (SCB) content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, MA) for polymer separation. A thermoelectric-cooled IR5 MCT detector (IR5) (Polymer Char, Spain) is connected to the GPC columns via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content is determined via an in-house method using the intensity ratio of CH$_3$ ($I_{CH3}$) to CH$_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) is used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

The long chain branches (LCBs) per 1000 total carbon atoms of the overall polymer can be calculated using the method of Janzen and Colby (J. Mol. Struct., 485/486, 569-584 (1999), incorporated herein by reference in its entirety), from values of zero shear viscosity, $\eta_0$ (determined from the Carreau-Yasuda model, described hereinabove), and measured values of Mw obtained using a Dawn EOS multiangle light scattering detector (Wyatt).

Metals content, such as the amount of catalyst residue in the ethylene polymer or article, can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Blow molding evaluations were performed on a Uniloy model 2016 single head reciprocating screw blow molding machine with an extruder screw diameter of 2.5" and a L/D Ratio of 20:1. Approximate 160-g parisons were extruded at 360° F. barrel setpoints and ~4000-5000 psig melt pressure using a 2.5" diverging die (0.013-0.017" die gaps), and then blown into a mold to produce 1-gallon industrial round handled bottles (mold #486, model 80014) weighing approximately 95-105 g at cycle times of 15-18 sec. The output of these polymers on the given machine and standard conditions (100 rpm with a 0.022" die gap) was measured to be approximately 1200-1400 g/min. These particular equipment and processing conditions were chosen because the blow molding performance and properties so obtained are typically representative of those obtained from larger, commercial scale blow molding operations.

The weight of the product produced (part weight) was recorded, and the width of the flash at the top of the product (layflat top) and the bottom of the product (layflat bottom) was measured. Die flare swell (parison size versus die size) and die weight swell (change in part weight at constant die gap and parison speed) can be determined. The melt strengths of the polymers were compared via a hang time test using a 0.022" die gap, 2.1 shot size and 20 rpm extruder speed. A parison was extruded and allowed to hang. The time from the end of the shot to the time the parison tore away from the bushing was recorded as the hang time.

Fluorided silica-coated alumina activator-supports used in Examples 1-20 were prepared as follows. Bohemite was obtained from W.R. Grace & Company under the designation "Alumina A" and having a surface area of about 300 $m^2/g$, a pore volume of about 1.3 mL/g, and an average particle size of about 100 microns. The alumina was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. in dry air. Afterward, the fluorided silica-coated alumina was collected and stored under dry nitrogen, and was used without exposure to the atmosphere.

Pilot plant polymerizations were conducted in a 30-gallon slurry loop reactor at a production rate of approximately 30-33 pounds of polymer per hour. Polymerization work was carried out under continuous particle form process conditions in a loop reactor (also referred to as a slurry process) by contacting a dual metallocene solution in toluene and isobutane and possibly 1-hexene, an organoaluminum solution (triisobutylaluminum, TIBA), and an activator-support (fluorided silica-coated alumina) in a 1-L stirred autoclave with continuous output to the loop reactor. The TIBA and dual metallocene solution were fed as separate streams into the isobutane flush. The activator-support was flushed with isobutane and the TIBA/metallocene mixture flowing together to the autoclave. The isobutane flush used to transport the activator-support into the autoclave was set at a rate that would result in a residence time of approximately 30 minutes in the autoclave. The total flow from the autoclave then entered the loop reactor.

Ethylene used was polymerization grade ethylene obtained from AirGas or Praxair which was purified through a column of alumina-zeolite adsorbent (activated at 230-290° C. in nitrogen). Polymerization grade 1-hexene (obtained from Chevron Phillips Chemical Company) which was purified by distillation and passed through a column of alumina-zeolite absorbent activated at 230-290° C. in nitrogen. The loop reactor was liquid full, 15.2 cm diameter, having a volume of 30 gallons (113.6 liters). Liquid isobutane was used as the diluent. Hydrogen was added to tune the molecular weight and/or HLMI of the polymer product. The isobutane was polymerization grade isobutane (obtained from Enterprise) that was further purified by distillation and subsequently passed through a column of alumina (activated at 230-290° C. in nitrogen). Co-catalyst TIBA was added in a concentration in a range of 75 to 130 ppm based on the weight of the diluent in the polymerization reactor.

Reactor conditions included a reactor pressure from 550 to 600 psig, a mol % ethylene of 11 to 13% (based on isobutane diluent), a 1-hexene content of 0.05 to 0.9 mol % (based on isobutane diluent), and a polymerization temperature of 97-100° C. The reactor was operated to have a residence time of about 0.8-1.35 hr. Total metallocene concentrations in the reactor were within a range of about 1.2 to 3.5 parts per million (ppm) by weight of the diluent. The activator-support (fluorided silica-coated alumina) was fed to the reactor at the rate of approximately 0.015-0.038 lb per hour. Polymer was removed from the reactor at the rate of about 30-33 lb/hr and passed through a flash chamber and a purge column. Nitrogen was fed to the purge column to ensure the fluff was hydrocarbon free. The structures for MET 1 and MET 2, used in Examples 1-20, are shown below:

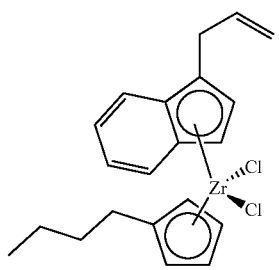

MET 1

-continued

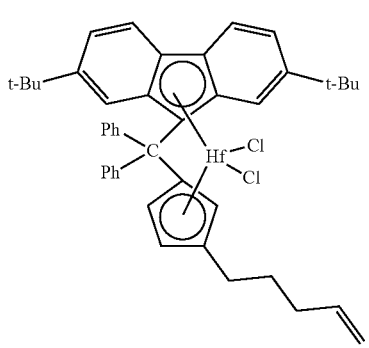

MET 2

Examples 1-22

Table I summarizes certain information relating to the polymerization experiments of Examples 1-20, and the MI, HLMI, HLMI/MI, density, and ESCR of the resulting ethylene polymer. Each of Examples 1-20 utilized a dual catalyst system containing MET 1 and MET 2 at the relative amounts listed in Table I. Examples 21-22 were comparative monomodal ethylene copolymer resins produced using a chromium-based catalyst system (Chevron-Phillips Chemical Company LP).

Figure 2:
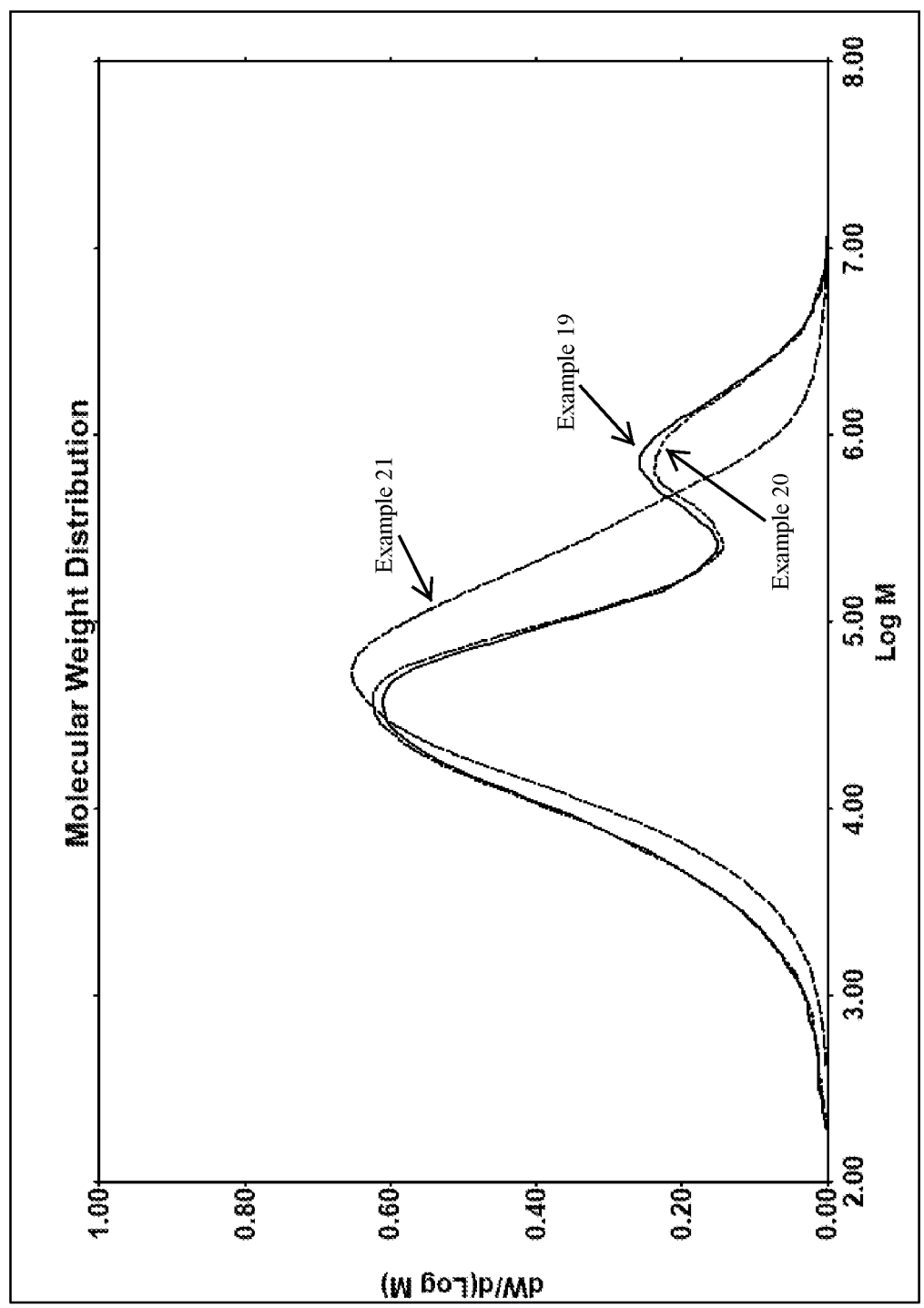
FIG. 2 presents a plot of the molecular weight distributions of the polymers of Examples 19-21.

FIG. 1 illustrates the bimodal molecular weight distributions (amount of polymer versus the logarithm of molecular weight) of the polymers of Examples 5 and 10-11 and the monomodal molecular weight distribution of comparative Example 21. FIG. 2 illustrates the molecular weight distributions of the polymers of Examples 19-21, Table II summarizes certain molecular weight characteristics of the polymers of Examples 1-20, Table III summarizes certain rheological characteristics at 190° C. for the polymers of Examples 1-20, Table IV summarizes the blow molding performance of the polymers of Examples 1-7, 9-14, and 16-21, and Table V summarizes the topload strength data for bottles formed from the polymers of Examples 1, 3, 5-6, 10-11, 17, and 19-22 (Example 22 was blow molded similarly to Example 21).

While each of Examples 1-20 had specific attributes that were improved over comparative Examples 21-22 and over traditional metallocene-based blow molding resin, Examples 5, 10-11, and 17-20 had the most beneficial combination of overall properties. As compared to Examples 21-22, Examples 5, 10-11, and 17-20 had lower MI values, higher densities (and thus, higher stiffness), higher ratios of HLMI/MI, and significantly improved ESCR Due to the similar density and similar catalyst system used for each of the examples, as well as the long time needed to perform ESCR testing, only Example 5 was tested. It is expected that Examples 1-4 and Examples 6-20—if tested—would pass at least 2000 hr, and likely 2500 hr, in the ESCR test.

In addition, topload strengths were unexpectedly increased by 30-40% or more over the chromium-based polymers of Examples 21-22, and even after downgauging 10%, the topload strengths were still 5-20% greater than that of the thicker bottles produced from the chromium-based polymers of Examples 21-22.

The polymers of Examples 5, 10-11, and 17-20 had IB parameters in the 1.5-1.7 range, IVc values in the 2.4-3.0 range, tan δ values at 0.1 $sec^{-1}$ in the 1.1-1.5 range, and slopes of the viscosity (Pa-sec) versus shear rate ($sec^{-1}$) at 100 $sec^{-1}$ in the 0.21-0.24 range. The lower HLMI polymers, such as Examples 5, 10-11, and 17, had HLMI values less than 30 g/10 min and less than comparative Examples 21-22, but due to their higher molecular weights, had melt strengths superior to that of comparative Example 21, as reflected in the hang times greater than 30 sec. Despite the lower HLMI and higher molecular weight, however and unexpectedly, Examples 5, 10-11, and 17 has comparable processability (part weights, cycle times, head pressures, and output rates) to the chromium-based polymer. Hence, these lower HLMI polymers processed similarly to chromium-based polymers, but with higher melt strengths and the aforementioned improvements in ESCR and bottle topload strength.

The higher HLMI polymers, such as Examples 18-20, had HLMI values greater than 30 g/10 min and greater than comparative Examples 21-22, and due to their lower molecular weights, had melt strengths slightly less than that of comparative Example 21, as reflected in the hang times less than 30 sec. Nonetheless, Examples 18-20 processed surprisingly better than the chromium-based polymer, with much lower head pressures and higher output rates, and with ESCR values and topload strengths comparable to the lower HLMI polymers (such as Examples 5, 10-11, and 17). Thus, these higher HLMI polymer processed easier than chromium-based polymers, but with acceptable melt strength and the aforementioned improvements in ESCR and bottle topload strength.

TABLE I

Examples 1-22-Polymerization Data and Polymer Melt Indices, Density, and ESCR

| Example | MET 2:MET 1 | lb H$_2$/1000 lb C$_2$H$_4$ | HLMI (g/10 min) | MI (g/10 min) | HLMI/MI | Density (g/cc) | ESCR (condition B, 10%, hr) |
|---|---|---|---|---|---|---|---|
| 1 | 0.92 | 0.100 | 13.0 | 0.05 | 277 | 0.9587 | >2000 * |
| 2 | 0.80 | 0.100 | 22.6 | 0.12 | 188 | 0.9601 | >2000 * |
| 3 | 0.84 | 0.100 | 17.6 | 0.07 | 248 | 0.9598 | >2000 * |
| 4 | 0.67 | 0.100 | 27.7 | 0.17 | 164 | 0.9604 | >2000 * |
| 5 | 0.73 | 0.120 | 23.9 | 0.08 | 306 | 0.9614 | 2700 |
| 6 | 0.89 | 0.120 | 21.4 | 0.07 | 329 | 0.9619 | >2000 * |
| 7 | 0.98 | 0.120 | 14.3 | 0.04 | 349 | 0.9612 | >2000 * |
| 8 | 1.10 | 0.149 | 9.8 | 0.03 | 306 | 0.9609 | >2000 * |
| 9 | 0.70 | 0.117 | 18.6 | 0.05 | 395 | 0.9619 | >2000 * |
| 10 | 0.67 | 0.117 | 22.4 | 0.06 | 373 | 0.9618 | >2000 * |
| 11 | 0.57 | 0.117 | 27.1 | 0.08 | 323 | 0.9630 | >2000 * |
| 12 | 0.49 | 0.117 | 37.3 | 0.13 | 287 | 0.9633 | >2000 * |
| 13 | 0.37 | 0.117 | 54.6 | 0.26 | 210 | 0.9644 | >2000 * |
| 14 | 0.47 | 0.117 | 40.5 | 0.15 | 270 | 0.9639 | >2000 * |
| 15 | 0.51 | 0.117 | 28.0 | 0.06 | 439 | 0.9631 | >2000 * |
| 16 | 0.80 | 0.127 | 20.8 | 0.05 | 455 | 0.9625 | >2000 * |

TABLE I-continued

Examples 1-22-Polymerization Data and Polymer Melt Indices, Density, and ESCR

| Example | MET 2:MET 1 | lb H$_2$/1000 lb C$_2$H$_4$ | HLMI (g/10 min) | MI (g/10 min) | HLMI/MI | Density (g/cc) | ESCR (condition B, 10%, hr) |
|---|---|---|---|---|---|---|---|
| 17 | 0.69 | 0.127 | 26.5 | 0.06 | 444 | 0.9632 | >2000 * |
| 18 | 0.55 | 0.127 | 36.8 | 0.11 | 341 | 0.9635 | >2000 * |
| 19 | 0.60 | 0.145 | 38.0 | 0.10 | 374 | 0.9639 | >2000 * |
| 20 | 0.55 | 0.145 | 44.9 | 0.13 | 344 | 0.9647 | >2000 * |
| 21 | — | — | 32.4 | 0.31 | 105 | 0.955 | 125 |
| 22 | — | — | 31.7 | 0.32 | 99 | 0.954 | 225 |

* Expected ESCR value

TABLE II

Examples 1-20-Molecular Weight Characterization (g/mol)

| Example | Mn/1000 | Mw/1000 | Mz/1000 | Mv/1000 | Mp/1000 | Mw/Mn | Mz/Mw | IB | IVc |
|---|---|---|---|---|---|---|---|---|---|
| 1 | 22.7 | 372 | 2108 | 257 | 52.0 | 16.4 | 5.7 | 1.58 | 3.35 |
| 2 | 23.6 | 324 | 2028 | 222 | 50:1 | 13.7 | 6.3 | 1.46 | 3.00 |
| 3 | 23.1 | 341 | 2011 | 234 | 52.0 | 14.8 | 5.9 | 1.49 | 3.13 |
| 4 | 22.8 | 303 | 2063 | 206 | 56.1 | 13.3 | 6.8 | 1.42 | 2.84 |
| 5 | 19.0 | 309 | 1794 | 212 | 44.7 | 16.3 | 5.8 | 1.57 | 2.91 |
| 6 | 17.4 | 294 | 1566 | 204 | 38.9 | 16.9 | 5.3 | 1.64 | 2.83 |
| 7 | 15.6 | 309 | 1566 | 217 | 32.9 | 19.8 | 5.1 | 1.75 | 2.95 |
| 8 | 12.9 | 302 | 1384 | 215 | 26.9 | 23.4 | 4.6 | 1.90 | 2.94 |
| 9 | 15.6 | 311 | 1918 | 212 | 44.9 | 19.9 | 6.2 | 1.65 | 2.91 |
| 10 | 14.7 | 298 | 1833 | 202 | 45.5 | 20.3 | 6.2 | 1.62 | 2.81 |
| 11 | 12.4 | 280 | 1942 | 188 | 47.8 | 22.7 | 6.9 | 1.59 | 2.66 |
| 12 | 12.2 | 259 | 1867 | 172 | 45.5 | 21.2 | 7.2 | 1.57 | 2.50 |
| 13 | 14.6 | 232 | 1743 | 155 | 44.9 | 15.9 | 7.5 | 1.47 | 2.32 |
| 14 | 12.9 | 257 | 1881 | 171 | 44.9 | 20.0 | 7.3 | 1.52 | 2.49 |
| 15 | 14.3 | 315 | 2157 | 208 | 43.8 | 22.1 | 6.8 | 1.58 | 2.87 |
| 16 | 10.5 | 291 | 1751 | 197 | 39.3 | 27.6 | 6.0 | 1.67 | 2.76 |
| 17 | 11.0 | 281 | 1695 | 191 | 35.4 | 25.7 | 6.0 | 1.65 | 2.70 |
| 18 | 12.1 | 260 | 1685 | 175 | 37.8 | 21.6 | 6.5 | 1.56 | 2.53 |
| 19 | 11.7 | 265 | 1790 | 178 | 31.1 | 22.7 | 6.7 | 1.64 | 2.56 |
| 20 | 12.1 | 250 | 1653 | 168 | 32.3 | 20.7 | 6.6 | 1.60 | 2.45 |

TABLE III

Examples 1-20-Rheological Characterization at 190° C.

| Example | Zero shear (Pa-sec) | Tau(η) (sec) | CY-a parameter | η @ 100 (Pa-sec) | η @ HLMI (Pa-sec) | Tan d @ 0.1 (degrees) | Tan d @ 100 (degrees) | Rheological Slope @ 100 |
|---|---|---|---|---|---|---|---|---|
| 1 | 1.45E+06 | 26.1 | 0.397 | 2128 | 2799 | 1.045 | 0.354 | 0.216 |
| 2 | 4.18E+06 | 95.6 | 0.246 | 1661 | 1003 | 0.940 | 0.432 | 0.259 |
| 3 | 2.23E+06 | 46.8 | 0.316 | 1858 | 1528 | 0.979 | 0.387 | 0.235 |
| 4 | 4.37E+07 | 1037.0 | 0.154 | 1489 | 758 | 0.857 | 0.511 | 0.301 |
| 5 | 7.10E+05 | 14.9 | 0.426 | 1651 | 851 | 1.194 | 0.354 | 0.217 |
| 6 | 4.62E+05 | 8.4 | 0.490 | 1756 | 1129 | 1.413 | 0.344 | 0.211 |
| 7 | 4.44E+05 | 6.7 | 0.541 | 2073 | 2516 | 1.551 | 0.334 | 0.205 |
| 8 | 3.63E+05 | 4.3 | 0.582 | 2450 | 5466 | 1.887 | 0.334 | 0.205 |
| 9 | 6.54E+05 | 12.1 | 0.465 | 1845 | 1436 | 1.260 | 0.344 | 0.211 |
| 10 | 7.10E+05 | 14.6 | 0.429 | 1686 | 943 | 1.201 | 0.353 | 0.216 |
| 11 | 7.34E+05 | 16.1 | 0.373 | 1526 | 622 | 1.189 | 0.380 | 0.231 |
| 12 | 9.00E+05 | 22.0 | 0.309 | 1310 | 351 | 1.139 | 0.417 | 0.251 |
| 13 | 2.22E+06 | 55.7 | 0.211 | 1067 | 212 | 1.057 | 0.502 | 0.296 |
| 14 | 1.07E+06 | 28.2 | 0.286 | 1218 | 268 | 1.101 | 0.429 | 0.258 |
| 15 | 9.47E+05 | 24.8 | 0.432 | 1486 | 487 | 1.037 | 0.340 | 0.209 |
| 16 | 5.73E+05 | 11.1 | 0.502 | 1762 | 1132 | 1.290 | 0.334 | 0.205 |
| 17 | 4.96E+05 | 10.6 | 0.476 | 1560 | 627 | 1.311 | 0.343 | 0.211 |
| 18 | 5.92E+05 | 14.6 | 0.369 | 1315 | 314 | 1.217 | 0.385 | 0.234 |
| 19 | 3.65E+05 | 8.4 | 0.432 | 1335 | 312 | 1.405 | 0.368 | 0.224 |
| 20 | 4.26E+05 | 10.9 | 0.392 | 1222 | 214 | 1.305 | 0.380 | 0.231 |

TABLE IV

| | | | | | | | | | | |
|---|---|---|---|---|---|---|---|---|---|---|
| Blow Molding Performance Comparison | | | | | | | | | | |
| Example | Temp (F.) | Weight Setting (%) | Parison Weight (g) | Part Weight (g) | Cycle Time (sec) | Head Pressure (psig) | Top Layflat (in) | Bottom Layflat (in) | 1 Min Output (g) | Hang Time (sec) |
| 1 | 413 | 0.8 | 160 | 95 | 15.4 | 4852 | 4.80 | 5.30 | 970 | 36 |
| 2 | 416 | 1.1 | 161 | 111 | 15.7 | 5225 | 4.87 | 5.27 | 1,304 | 37 |
| 3 | 415 | 1.1 | 161 | 103 | 15.6 | 5082 | 4.85 | 5.40 | 1,220 | 37 |
| 4 | 414 | 1.1 | 158 | 120 | 15.7 | 5180 | 5.20 | 5.19 | 1,329 | 29 |
| 5 | 413 | 1.1 | 162 | 95 | 16.5 | 4375 | 4.72 | 5.29 | 1,301 | 33 |
| 6 | 412 | 1.1 | 161 | 87 | 16.9 | 4028 | 4.57 | 5.28 | 1,267 | 39 |
| 7 | 405 | 0.9 | 160 | 76 | 17.0 | 3945 | 4.37 | 5.02 | 1,240 | 39 |
| 9 | 414 | 0.8 | 161 | 90 | 16.3 | 4830 | 4.60 | 5.06 | 1,300 | >37 |
| 10 | 414 | 0.8 | 161 | 93 | 16.2 | 4850 | 4.63 | 5.30 | 1,303 | >38 |
| 11 | 417 | 0.9 | 164 | 97 | 16.8 | 4520 | 4.79 | 5.36 | 1,283 | 32 |
| 12 | 411 | 1.1 | 165 | 106 | 16.9 | 4335 | 4.86 | 5.39 | 1,315 | 71 |
| 13 | 406 | 1.1 | 167 | 115 | 17.1 | 4123 | 4.95 | 5.34 | 1,342 | 14 |
| 14 | 411 | 1.0 | 165 | 106 | 16.9 | 4353 | 4.86 | 5.39 | 1,323 | 21 |
| 16 | 417 | 0.8 | 161 | 87 | 16.3 | 4782 | 4.70 | 5.17 | 1,297 | >38 |
| 17 | 411 | 0.9 | 163 | 92 | 16.8 | 4482 | 4.58 | 5.26 | 1,293 | >38 |
| 18 | 412 | 0.9 | 164 | 100 | 16.9 | 4357 | 4.74 | 5.35 | 1,318 | 25 |
| 19 | 414 | 1.0 | 164 | 95 | 17.5 | 4170 | 4.66 | 5.33 | 1,313 | 22 |
| 20 | 413 | 1.1 | 166 | 99 | 17.5 | 4022 | 4.69 | 5.33 | 1,321 | 18 |
| 21 | 412 | 1.0 | 161 | 105 | 16.4 | 4977 | 5.13 | 5.53 | 1,299 | 30 |

TABLE V

| | | | | |
|---|---|---|---|---|
| Topload Strength Comparison | | | | |
| Example | Part Weight (g) Standard 105 g Target | Topload Strength (lb) | Part Weight (g) Downgauged 95 g Target | Topload Strength (lb) |
| 1 | 105.2 | 221 | 95.0 | 171 |
| 3 | 104.8 | 218 | 102.7 | 209 |
| 5 | 104.9 | 225 | 94.9 | 181 |
| 6 | 105.5 | 236 | 86.9 | 156 |
| 10 | 105.3 | 236 | 94.8 | 185 |
| 11 | 105.1 | 240 | 95.2 | 194 |
| 17 | 105.3 | 247 | 94.8 | 200 |
| 19 | 105.0 | 224 | 94.7 | 188 |
| 20 | 105.5 | 225 | 94.9 | 186 |
| 21 | 105.3 | 170 | 97.6 | 151 |
| 22 | 104.7 | 168 | 95.5 | 141 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer having (or characterized by):

a density in a range from about 0.952 to about 0.968 g/cm$^3$;

a HLMI in a range from about 10 to about 30 g/10 min, and a ratio of HLMI/MI in a range from about 185 to about 550;

a Mw in a range from about 250,000 to about 450,000 g/mol;

an IB parameter in a range from about 1.46 to about 1.80;

an IVc in a range from about 2.2 to about 3.2 dL/g;

a tan δ at 0.1 sec$^{-1}$ in a range from about 1.05 to about 1.75 degrees; and a slope of a plot of viscosity (Pa-sec) versus shear rate (sec$^{-1}$) of the ethylene polymer at 100 sec$^{-1}$ in a range from about 0.18 to about 0.28.

Aspect 2. The polymer defined in aspect 1, wherein the ethylene polymer has a HLMI in any range disclosed herein, e.g., from about 15 to about 30, from about 20 to about 30, from about 15 to about 28, or from about 20 to about 28 g/10 min.

Aspect 3. The polymer defined in aspect 1 or 2, wherein the ethylene polymer has a Mw in any range disclosed herein, e.g., from about 250,000 to about 400,000, from about 250,000 to about 370,000, from about 250,000 to about 340,000, from about 270,000 to about 370,000, or from about 270,000 to about 320,000 g/mol.

Aspect 4. An ethylene polymer having (or characterized by):

a density in a range from about 0.952 to about 0.968 g/cm$^3$;

a HLMI in a range from about 30 to about 55 g/10 min, and a ratio of HLMI/MI in a range from about 185 to about 550;

a Mw in a range from about 200,000 to about 300,000 g/mol;

an IB parameter in a range from about 1.46 to about 1.80;

a tan δ at 0.1 sec$^{-1}$ in a range from about 1.05 to about 1.75 degrees; and a slope of a plot of viscosity (Pa-sec) versus shear rate (sec$^{-1}$) of the ethylene polymer at 100 sec$^{-1}$ in a range from about 0.18 to about 0.28.

Aspect 5. The polymer defined in aspect 4, wherein the ethylene polymer has a HLMI in any range disclosed herein, e.g., from about 30 to about 50, from about 30 to about 48, from about 32 to about 50, or from about 32 to about 48 g/10 min.

Aspect 6. The polymer defined in aspect 4 or 5, wherein the ethylene polymer has a Mw in any range disclosed herein, e.g., from about 200,000 to about 280,000, from about 210,000 to about 300,000, from about 210,000 to about 280,000, from about 230,000 to about 300,000, or from about 230,000 to about 280,000 g/mol.

Aspect 7. The polymer defined in any one of the preceding aspects, wherein the ethylene polymer has an IVc in any range disclosed herein, e.g., from about 2.2 to about 3.2, from about 2.2 to about 3.1, from about 2.2 to about 3, from about 2.3 to about 3.2, from about 2.3 to about 3.1, from about 2.3 to about 3, or from about 2.5 to about 3.1 dL/g.

Aspect 8. The polymer defined in any one of the preceding aspects, wherein the ethylene polymer has an IB parameter in any range disclosed herein, e.g., from about 1.46 to about 1.75, from about 1.46 to about 1.65, from about 1.48 to about 1.80, from about 1.48 to about 1.70, from about 1.50 to about 1.80, from about 1.50 to about 1.75, or from about 1.50 to about 1.70.

Aspect 9. The polymer defined in any one of the preceding aspects, wherein the ethylene polymer has a tan δ (tan d or tangent delta) at 0.1 sec$^{-1}$ in any range disclosed herein, e.g., from about 1.05 to about 1.65, from about 1.05 to about 1.55, from about 1.05 to about 1.45, from about 1.10 to about 1.70, from about 1.10 to about 1.60, or from about 1.10 to about 1.50 degrees.

Aspect 10. The polymer defined in any one of the preceding aspects, wherein the ethylene polymer has a slope of a plot of viscosity (Pa-sec) versus shear rate (sec$^{-1}$) of the ethylene polymer at 100 sec$^{-1}$ in any range disclosed herein, e.g., from about 0.18 to about 0.27, from about 0.18 to about 0.26, from about 0.19 to about 0.27, from about 0.19 to about 0.25, from about 0.20 to about 0.28, or from about 0.20 to about 0.26.

Aspect 11. The polymer defined in any one of the preceding aspects, wherein the ethylene polymer has a density in any range disclosed herein, e.g., from about 0.952 to about 0.966, from about 0.955 to about 0.968, from about 0.955 to about 0.966, from about 0.957 to about 0.968, or from about 0.957 to about 0.966 g/cm$^3$.

Aspect 12. The polymer defined in any one of the preceding aspects, wherein the ethylene polymer has a ratio of HLMI/MI in any range disclosed herein, e.g., from about 200 to about 550, from about 30) to about 550, from about 250 to about 550, from about 250 to about 500, from about 275 to about 550, or from about 275 to about 475.

Aspect 13. The polymer defined in any one of the preceding aspects, wherein the ethylene polymer has a melt index (MI) in any range disclosed herein, e.g., from about 0.03 to about 0.6, from about 0.03 to about 0.3, from about 0.05 to about 0.3, or from about 0.05 to about 0.2 g/10 min.

Aspect 14. The polymer defined in any one of the preceding aspects, wherein the ethylene polymer has a Mp in any range disclosed herein, e.g., from about 25,000 to about 55,000, from about 25,000 to about 50,000, from about 25,000 to about 45,000, from about 25,000 to about 40,000, from about 30,000 to about 55,000, or from about 30,000 to about 50,000 g/mol.

Aspect 15. The polymer defined in any one of the preceding aspects, wherein the ethylene polymer has a Mn in any range disclosed herein, e.g., from about 8,000 to about 30,000, from about 8,000 to about 25,000, from about 8,000 to about 18,000, from about 10,000 to about 30,000, or from about 10,000 to about 25,000 g/mol.

Aspect 16. The polymer defined in any one of the preceding aspects, wherein the ethylene polymer has a Mz in any range disclosed herein, e.g., from about 1,300,000 to about 2,600,000, from about 1,300,000 to about 2,100,000, from about 1,300,000 to about 1,900,000, from about 1,500,000 to about 2,500,000, or from about 1,500,000 to about 2,300,000 g/mol.

Aspect 17. The polymer defined in any one of the preceding aspects, wherein the ethylene polymer has a Mv in any range disclosed herein, e.g., from about 140,000 to about 280,000, from about 150,000 to about 250,000, from about 150,000 to about 230,000, from about 150,000 to about 200,000, from about 150,000 to about 185,000, or from about 180,000 to about 220,000 g/mol.

Aspect 18. The polymer defined in any one of the preceding aspects, wherein the ethylene polymer has a ratio of Mw/Mn in any range disclosed herein, e.g., from about 12 to about 30, from about 12 to about 28, from about 12 to about 26, from about 14 to about 30, from about 14 to about 28, or from about 17 to about 28.

Aspect 19. The polymer defined in any one of the preceding aspects, wherein the ethylene polymer has a ratio of Mz/Mw in any range disclosed herein, e.g., from about 4.5 to about 8, from about 5 to about 8, from about 5 to about 7.5, from about 5.3 to about 8, from about 5.3 to about 7.5, from about 5.3 to about 7.2, or from about 5.5 to about 7.5.

Aspect 20. The polymer defined in any one of the preceding aspects, wherein the ethylene polymer has a CY-a parameter in any range disclosed herein, e.g., from about 0.3 to about 0.6, from about 0.3 to about 0.5, from about 0.32 to about 0.55, from about 0.32 to about 0.5, from about 0.34 to about 0.5, or from about 0.34 to about 0.48.

Aspect 21. The polymer defined in any one of the preceding aspects, wherein the ethylene polymer has a viscosity at 100 sec$^{-1}$ (eta @ 100 or η @ 100) in any range disclosed herein, e.g., from about 1000 to about 2200, from about 1000 to about 1500, from about 1000 to about 1400, from about 1100 to about 2000, or from about 1400 to about 1800 Pa-sec.

Aspect 22. The polymer defined in any one of the preceding aspects, wherein the ethylene polymer has a viscosity at HLMI (eta @ HLMI or η @ HLMI) in any range disclosed herein, e.g., from about 100 to about 1400, from about 100 to about 1200, from about 100 to about 500, from about 300 to about 1200, from about 400 to about 1200, or from about 400 to about 1000 Pa-sec.

Aspect 23. The polymer defined in any one of the preceding aspects, wherein the ethylene polymer has a tan δ (tan d or tangent delta) at 100 sec$^{-1}$ in any range disclosed herein, e.g., from about 0.3 to about 0.5, from about 0.3 to about 0.45, from about 0.3 to about 0.42, from about 0.3 to about 0.4, from about 0.32 to about 0.42, or from about 0.32 to about 0.4 degrees.

Aspect 24. The polymer defined in any one of the preceding aspects, wherein the ethylene polymer has a relaxation time (Tau(eta) or τ(η)) in any range disclosed herein, e.g., from about 3 to about 30, from about 3 to about 20, from about 5 to about 30, or from about 5 to about 20 sec.

Aspect 25. The polymer defined in any one of the preceding aspects, wherein the ethylene polymer has an environmental stress crack resistance (ESCR) in any range disclosed herein, e.g., at least 500 hours, at least 1,000 hours, at least 1,500 hours, at least 2,000 hours, or at least 2,500 hours.

Aspect 26. The polymer defined in any one of the preceding aspects, wherein the ethylene polymer has less than about 0.008 long chain branches (LCBs) per 1000 total carbon atoms, e.g., less than about 0.005 LCBs, or less than about 0.003 LCBs.

Aspect 27. The polymer defined in any one of the preceding aspects, wherein the ethylene polymer has a reverse comonomer distribution, e.g., the number of short chain branches (SCBs) per 1000 total carbon atoms of the polymer at Mw is greater than at Mn, the number of SCBs per 1000 total carbon atoms of the polymer at Mz is greater than at Mw, or the number of SCBs per 1000 total carbon atoms of the polymer at Mz is greater than at Mn.

Aspect 28. The polymer defined in any one of the preceding aspects, wherein the ethylene polymer has a topload strength at a part weight of 105 g in any range disclosed herein, e.g., from about 180 to about 270, from about 200 to about 270, from about 200 to about 260, or from about 210 to about 260 lb.

Aspect 29. The polymer defined in any one of the preceding aspects, wherein the ethylene polymer has a topload strength at a part weight of 95 g in any range disclosed herein, e.g., from about 160 to about 230, from about 160 to about 220, from about 170 to about 230, or from about 170 to about 220 lb.

Aspect 30. The polymer defined in any one of the preceding aspects, wherein the ethylene polymer has a bimodal molecular weight distribution.

Aspect 31. The polymer defined in any one of the preceding aspects, wherein the ethylene polymer is a single reactor product, e.g., not a post-reactor blend of two polymers, for instance, having different molecular weight characteristics.

Aspect 32. The polymer defined in any one of the preceding aspects, wherein the ethylene polymer comprises an ethylene/α-olefin copolymer.

Aspect 33. The polymer defined in any one of the preceding aspects, wherein the ethylene polymer comprises an ethylene homopolymer, an ethylene/1-butene copolymer, an ethylene/1-hexene copolymer, and/or an ethylene/1-octene copolymer.

Aspect 34. The polymer defined in any one of the preceding aspects, wherein the ethylene polymer comprises an ethylene/1-hexene copolymer.

Aspect 35. The polymer defined in any one of the preceding aspects, wherein the ethylene polymer contains, independently, less than 0.1 ppm (by weight), less than 0.08 ppm, less than 0.05 ppm, or less than 0.03 ppm, of chromium and titanium.

Aspect 36. An article comprising the ethylene polymer defined in any one of the preceding aspects.

Aspect 37. An article comprising the ethylene polymer defined in any one of aspects 1-35, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 38. A catalyst composition comprising: catalyst component I comprising any unbridged metallocene compound disclosed herein, catalyst component II comprising any bridged metallocene compound disclosed herein, any activator disclosed herein, and optionally, any co-catalyst disclosed herein.

Aspect 39. The composition defined in aspect 38, wherein catalyst component II comprises a bridged zirconium or hafnium based metallocene compound.

Aspect 40. The composition defined in aspect 38, wherein catalyst component II comprises a bridged zirconium or hafnium based metallocene compound with an alkenyl substituent.

Aspect 41. The composition defined in aspect 38, wherein catalyst component II comprises a bridged zirconium or hafnium based metallocene compound with an alkenyl substituent and a fluorenyl group.

Aspect 42. The composition defined in aspect 38, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Aspect 43. The composition defined in any one of aspects 38-42, wherein catalyst component II comprises a bridged metallocene compound having an aryl group substituent on the bridging group.

Aspect 44. The composition defined in any one of aspects 38-43, wherein catalyst component I comprises an unbridged zirconium or hafnium based metallocene compound containing two cyclopentadienyl groups, two indenyl groups, or a cyclopentadienyl and an indenyl group.

Aspect 45. The composition defined in any one of aspects 38-43, wherein catalyst component I comprises an unbridged zirconium or hafnium based metallocene compound containing two cyclopentadienyl groups.

Aspect 46. The composition defined in any one of aspects 38-43, wherein catalyst component I comprises an unbridged zirconium or hafnium based metallocene compound containing two indenyl groups.

Aspect 47. The composition defined in any one of aspects 38-43, wherein catalyst component I comprises an unbridged zirconium or hafnium based metallocene compound containing a cyclopentadienyl and an indenyl group.

Aspect 48. The composition defined in any one of aspects 38-47, wherein the activator comprises an activator-support, an aluminoxane compound, an organoboron or organoborate compound, an ionizing ionic compound, or any combination thereof.

Aspect 49. The composition defined in any one of aspects 38-47, wherein the activator comprises an aluminoxane compound.

Aspect 50. The composition defined in any one of aspects 38-47, wherein the activator comprises an organoboron or organoborate compound.

Aspect 51. The composition defined in any one of aspects 38-47, wherein the activator comprises an ionizing ionic compound.

Aspect 52. The composition defined in any one of aspects 38-47, wherein the activator comprises an activator-support, the activator-support comprising any solid oxide treated with any electron-withdrawing anion disclosed herein.

Aspect 53. The composition defined in any one of aspects 38-47, wherein the activator comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, phosphated silica-coated alumina, or any combination thereof.

Aspect 54. The composition defined in any one of aspects 38-47, wherein the activator comprises a fluorided solid oxide and/or a sulfated solid oxide.

Aspect 55. The composition defined in any one of aspects 38-54, wherein the catalyst composition comprises a co-catalyst, e.g., any co-catalyst disclosed herein.

Aspect 56. The composition defined in any one of aspects 38-55, wherein the co-catalyst comprises any organoaluminum compound disclosed herein.

Aspect 57. The composition defined in aspect 56, wherein the organoaluminum compound comprises trimethylaluminum, triethylaluminum, triisobutylaluminum, or a combination thereof.

Aspect 58. The composition defined in any one of aspects 52-57, wherein the catalyst composition comprises catalyst component I, catalyst component II, a solid oxide treated with an electron-withdrawing anion, and an organoaluminum compound.

Aspect 59. The composition defined in any one of aspects 52-58, wherein the catalyst composition is substantially free of aluminoxane compounds, organoboron or organoborate compounds, ionizing ionic compounds, or combinations thereof.

Aspect 60. The composition defined in any one of aspects 38-59, wherein a weight ratio of catalyst component I to catalyst component II in the catalyst composition is in any range disclosed herein, e.g., from about 10:1 to about 1:10, from about 5:1 to about 1:5, or from about 2:1 to about 1:2.

Aspect 61. The composition defined in any one of aspects 38-60, wherein the catalyst composition is produced by a process comprising contacting, in any order, catalyst component I, catalyst component II, and the activator, or contacting, in any order, catalyst component I, catalyst component II, the activator, and the co-catalyst.

Aspect 62. The composition defined in any one of aspects 38-61, wherein a catalyst activity of the catalyst composition is in any range disclosed herein, e.g., from about 150 to about 10,000, from about 500 to about 7,500, or from about 1,000 to about 5,000 grams, of ethylene polymer per gram of activator-support per hour, under slurry polymerization conditions, with a triisobutylaluminum co-catalyst, using isobutane as a diluent, and with a polymerization temperature of 90° C. and a reactor pressure of 390 psig.

Aspect 63. An olefin polymerization process, the process comprising contacting the catalyst composition defined in any one of aspects 38-62 with an olefin monomer and an optional olefin comonomer in a polymerization reactor system under polymerization conditions to produce an olefin polymer.

Aspect 64. The process defined in aspect 63, wherein the olefin monomer comprises any olefin monomer disclosed herein, e.g., any $C_2$-$C_{20}$ olefin.

Aspect 65. The process defined in aspect 63 or 64, wherein the olefin monomer and the optional olefin comonomer independently comprise a $C_2$-$C_{20}$ alpha-olefin.

Aspect 66. The process defined in any one of aspects 63-65, wherein the olefin monomer comprises ethylene.

Aspect 67. The process defined in any one of aspects 63-66, wherein the catalyst composition is contacted with ethylene and an olefin comonomer comprising a $C_3$-$C_{10}$ alpha-olefin.

Aspect 68. The process defined in any one of aspects 63-67, wherein the catalyst composition is contacted with ethylene and an olefin comonomer comprising 1-butene, 1-hexene, 1-octene, or a mixture thereof.

Aspect 69. The process defined in any one of aspects 63-68, wherein the polymerization reactor system comprises a batch reactor, a slurry reactor, a gas-phase reactor, a solution reactor, a high pressure reactor, a tubular reactor, an autoclave reactor, or a combination thereof.

Aspect 70. The process defined in any one of aspects 63-69, wherein the polymerization reactor system comprises a slurry reactor, a gas-phase reactor, a solution reactor, or a combination thereof.

Aspect 71. The process defined in any one of aspects 63-70, wherein the polymerization reactor system comprises a loop slurry reactor.

Aspect 72. The process defined in any one of aspects 63-71, wherein the polymerization reactor system comprises a single reactor.

Aspect 73. The process defined in any one of aspects 63-71, wherein the polymerization reactor system comprises 2 reactors.

Aspect 74. The process defined in any one of aspects 63-71, wherein the polymerization reactor system comprises more than 2 reactors.

Aspect 75. The process defined in any one of aspects 63-74, wherein the olefin polymer comprises any olefin polymer disclosed herein.

Aspect 76. The process defined in any one of aspects 63-75, wherein the olefin polymer comprises an ethylene homopolymer, an ethylene/1-butene copolymer, an ethylene/1-hexene copolymer, and/or an ethylene/1-octene copolymer.

Aspect 77. The process defined in any one of aspects 63-76, wherein the olefin polymer comprises an ethylene/1-hexene copolymer.

Aspect 78. The process defined in any one of aspects 63-77, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 79. The process defined in any one of aspects 63-78, wherein the polymerization conditions are substantially constant, e.g., for a particular polymer grade.

Aspect 80. The process defined in any one of aspects 63-79, wherein no hydrogen is added to the polymerization reactor system.

Aspect 81. The process defined in any one of aspects 63-79, wherein hydrogen is added to the polymerization reactor system.

Aspect 82. The process defined in any one of aspects 63-81, wherein the olefin polymer produced is defined in any one of aspects 1-35.

Aspect 83. An olefin polymer produced by the olefin polymerization process defined in any one of aspects 63-81.

Aspect 84. An ethylene polymer defined in any one of aspects 1-35 produced by the process defined in any one of aspects 63-81.

Aspect 85. An article (e.g., a blow molded bottle or other blow molded article) comprising the polymer defined in aspect 83 or 84.

The invention claimed is:
1. An ethylene polymer having:
   a density in a range from about 0.952 to about 0.968 g/cm$^3$;
   a HLMI in a range from about 10 to about 30 g/10 min, and a ratio of HLMI/MI in a range from about 185 to about 550;
   a Mw in a range from about 250,000 to about 450,000 g/mol;
   an IB parameter in a range from about 1.46 to about 1.80;
   an IVc in a range from about 2.2 to about 3.2 dL/g;
   a tan δ at 0.1 sec$^{-1}$ in a range from about 1.05 to about 1.75 degrees; and
   a slope of a plot of viscosity (Pa-sec) versus shear rate (sec$^{-1}$) of the ethylene polymer at 100 sec$^{-1}$ in a range from about 0.18 to about 0.28.
2. An article comprising the ethylene polymer of claim 1.
3. The polymer of claim 1, wherein:
   the density is in a range from about 0.955 to about 0.968 g/cm$^3$;
   the HLMI is in a range from about 20 to about 30 g/10 min;
   the ratio of HLMI/MI is in a range from about 250 to about 550;

the Mw is in a range from about 250,000 to about 340,000 g/mol;
the IVc is in a range from about 2.3 to about 3.1 dL/g;
the IB parameter is in a range from about 1.50 to about 1.75;
the tan δ at 0.1 sec$^{-1}$ is in a range from about 1.10 to about 1.50 degrees; and
the slope is in a range from about 0.19 to about 0.25.

4. The polymer of claim 3, wherein the ethylene polymer comprises an ethylene/1-butene copolymer, an ethylene/1-hexene copolymer, and/or an ethylene/1-octene copolymer.

5. The polymer of claim 4, wherein the ethylene polymer has an environmental stress crack resistance (ESCR) of at least 2,000 hours.

6. A blow molded article comprising the ethylene polymer of claim 5.

7. The polymer of claim 1, wherein the ethylene polymer has:
a Mp in a range from about 30,000 to about 55,000 g/mol;
a ratio of Mw/Mn in a range from about 12 to about 30; and
a ratio of Mz/Mw in a range from about 5 to about 8.

8. The polymer of claim 1, wherein the ethylene polymer has:
a CY-a parameter in a range from about 0.32 to about 0.55;
a viscosity at 100 sec$^{-1}$ in a range from about 1100 to about 2000 Pa-sec;
a tan δ at 100 sec$^{-1}$ in a range from about 0.3 to about 0.5 degrees; and
a relaxation time in a range from about 3 to about 30 sec.

9. The polymer of claim 1, wherein the ethylene polymer has:
a bimodal molecular weight distribution;
less than about 0.008 long chain branches per 1000 total carbon atoms; and
a number of short chain branches per 1000 total carbon atoms at Mz that is greater than at Mn.

10. The polymer of claim 1, wherein:
the ethylene polymer contains, independently, less than 0.1 ppm by weight of chromium and titanium; and
the ethylene polymer has a topload strength:
from about 180 to about 270 lb at a part weight of 105 g; and/or
from about 160 to about 230 lb at a part weight of 95 g.

11. An ethylene polymer having:
a density in a range from about 0.952 to about 0.968 g/cm$^3$;
a HLMI in a range from about 30 to about 55 g/10 min, and a ratio of HLMI/MI in a range from about 185 to about 550;
a Mw in a range from about 200,000 to about 300,000 g/mol;
an IB parameter in a range from about 1.46 to about 1.80;
a tan δ at 0.1 sec$^{-1}$ in a range from about 1.05 to about 1.75 degrees; and
a slope of a plot of viscosity (Pa-sec) versus shear rate (sec$^{-1}$) of the ethylene polymer at 100 sec$^{-1}$ in a range from about 0.18 to about 0.28.

12. An article comprising the ethylene polymer of claim 11.

13. The polymer of claim 11, wherein:
the density is in a range from about 0.955 to about 0.968 g/cm$^3$;
the HLMI is in a range from about 30 to about 50 g/10 min;
the ratio of HLMI/MI is in a range from about 250 to about 550;
the Mw is in a range from about 210,000 to about 280,000 g/mol;
the IB parameter is in a range from about 1.46 to about 1.75;
the tan δ at 0.1 sec$^{-1}$ is in a range from about 1.10 to about 1.60 degrees; and
the slope is in a range from about 0.19 to about 0.27.

14. The polymer of claim 13, wherein:
the ethylene polymer comprises an ethylene/1-butene copolymer, an ethylene/1-hexene copolymer, and/or an ethylene/1-octene copolymer; and
the ethylene polymer has an environmental stress crack resistance (ESCR) of at least 2,000 hours.

15. A blow molded article comprising the ethylene polymer of claim 14.

16. The polymer of claim 11, wherein the ethylene polymer has:
a Mp in a range from about 25,000 to about 45,000 g/mol;
a ratio of Mw/Mn in a range from about 14 to about 28; and
a ratio of Mz/Mw in a range from about 5.3 to about 7.5.

17. The polymer of claim 11, wherein the ethylene polymer has:
a CY-a parameter in a range from about 0.3 to about 0.5;
a viscosity at 100 sec$^{-1}$ in a range from about 1000 to about 1500 Pa-sec;
a tan δ at 100 sec$^{-1}$ in a range from about 0.3 to about 0.5 degrees; and
a relaxation time in a range from about 3 to about 20 sec.

18. A polymerization process, the process comprising contacting a catalyst composition with ethylene and an α-olefin comonomer in a polymerization reactor system under polymerization conditions to produce an ethylene polymer, wherein the ethylene polymer has:
a density in a range from about 0.952 to about 0.968 g/cm$^3$;
a HLMI in a range from about 10 to about 55 g/10 min, and a ratio of HLMI/MI in a range from about 185 to about 550;
a Mw in a range from about 200,000 to about 450,000 g/mol;
an IB parameter in a range from about 1.46 to about 1.80;
an IVc in a range from about 2.2 to about 3.2 dL/g;
a tan δ at 0.1 sec$^{-1}$ in a range from about 1.05 to about 1.75 degrees; and
a slope of a plot of viscosity (Pa-sec) versus shear rate (sec$^{-1}$) of the ethylene polymer at 100 sec$^{-1}$ in a range from about 0.18 to about 0.28; and
the catalyst composition comprises:
an unbridged metallocene compound containing two cyclopentadienyl groups, two indenyl groups, or a cyclopentadienyl and an indenyl group;
a bridged metallocene compound with a cyclopentadienyl group and fluorenyl group, and an alkenyl substituent on the cyclopentadienyl group and/or on the bridging group;
an activator-support comprising a solid oxide treated with an electron-withdrawing anion; and
an organoaluminum compound.

19. The process of claim 18, wherein the activator-support comprises a fluorided solid oxide and/or a sulfated solid oxide.

20. The process of claim 18, wherein the polymerization reactor system comprises a slurry reactor, gas-phase reactor, solution reactor, or a combination thereof.

* * * * *